Aug. 21, 1956   C. E. BEACH ET AL   2,759,670
SENSING DEVICES FOR DATA RECORDS
Original Filed March 14, 1950   7 Sheets-Sheet 1

INVENTORS
C. E. Beach
WILLIAM P. MUNGER-DECEASED
MARY C. MUNGER-EXR'X.
BY C. E. Beach
HER ATTORNEY

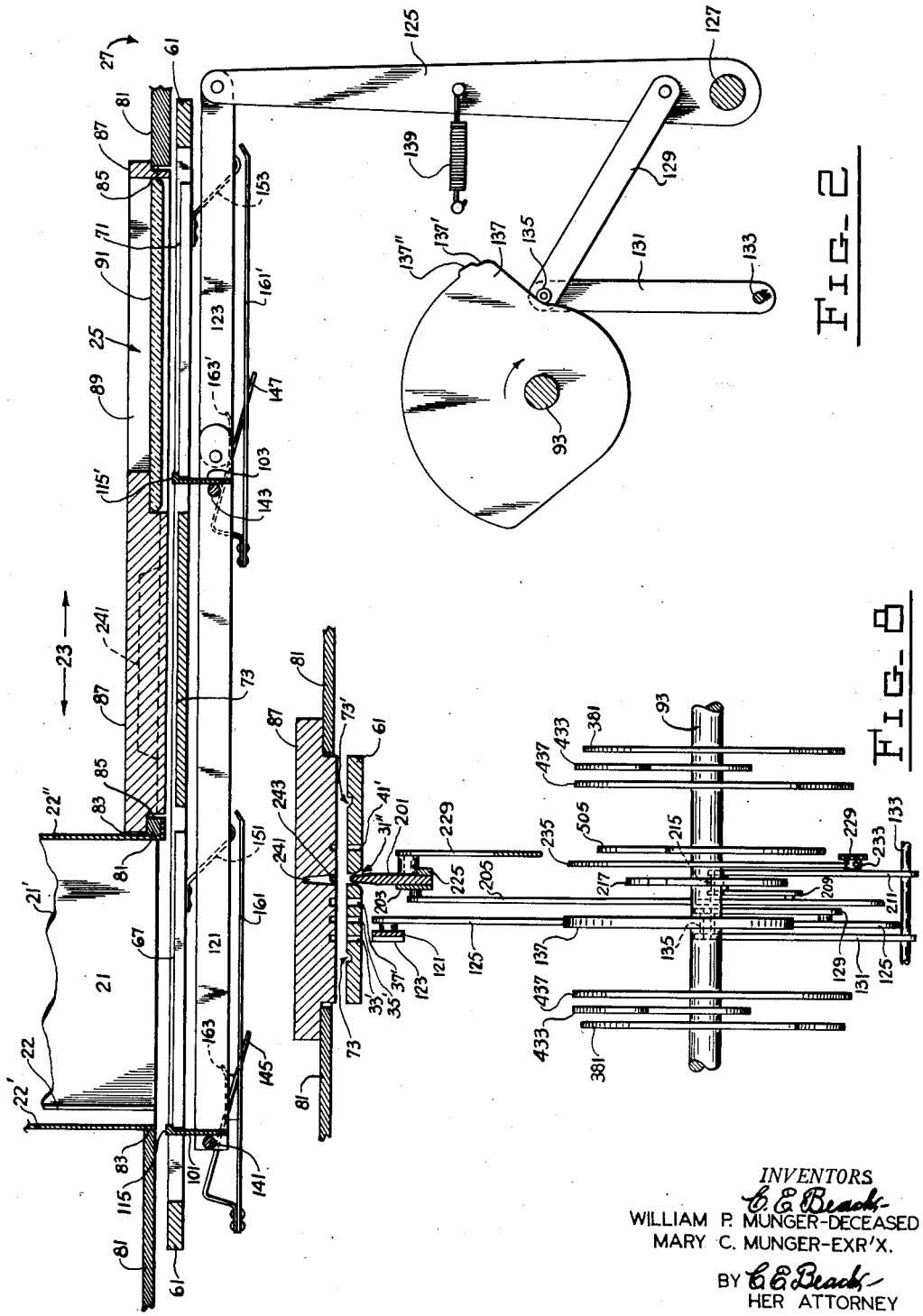

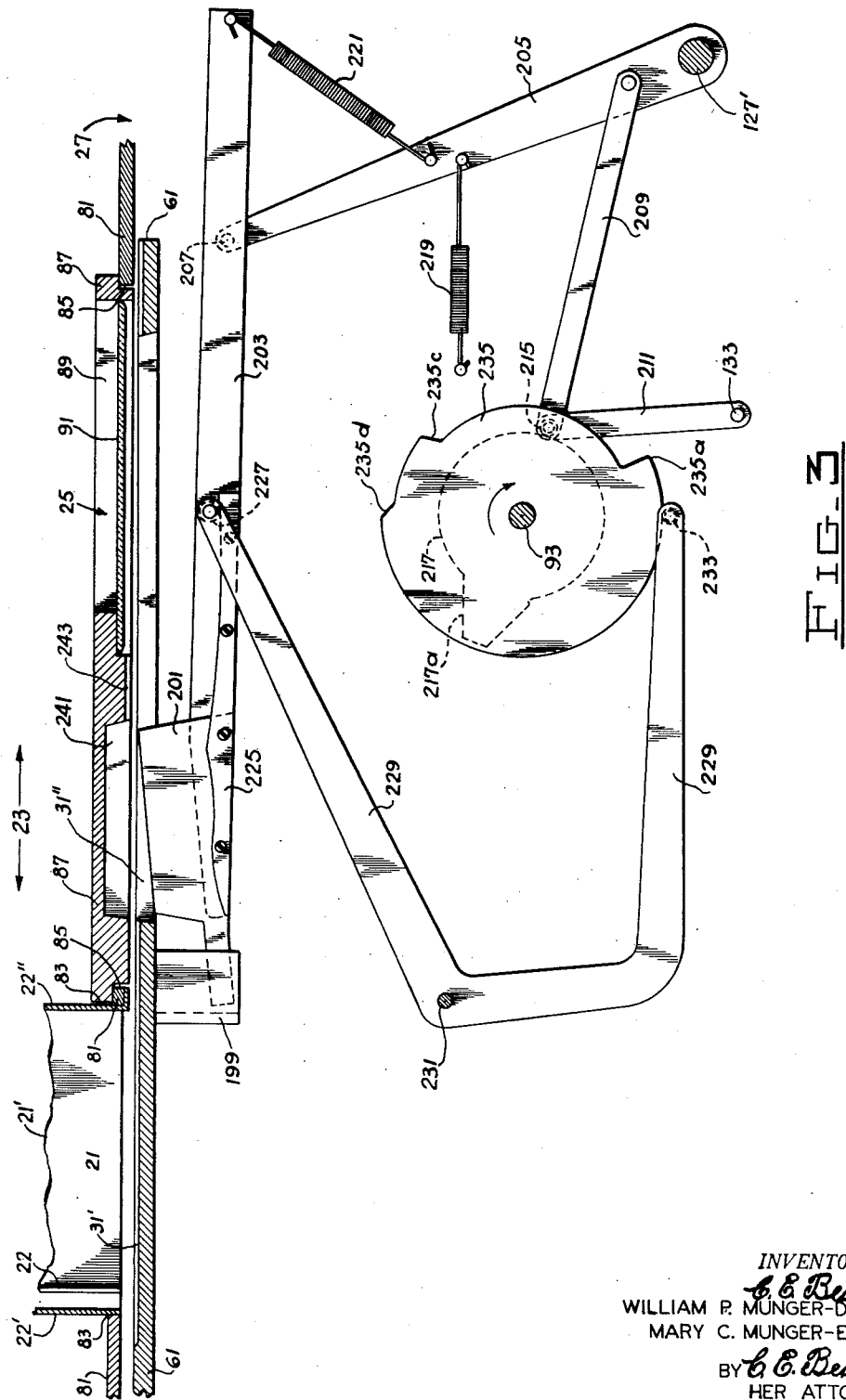

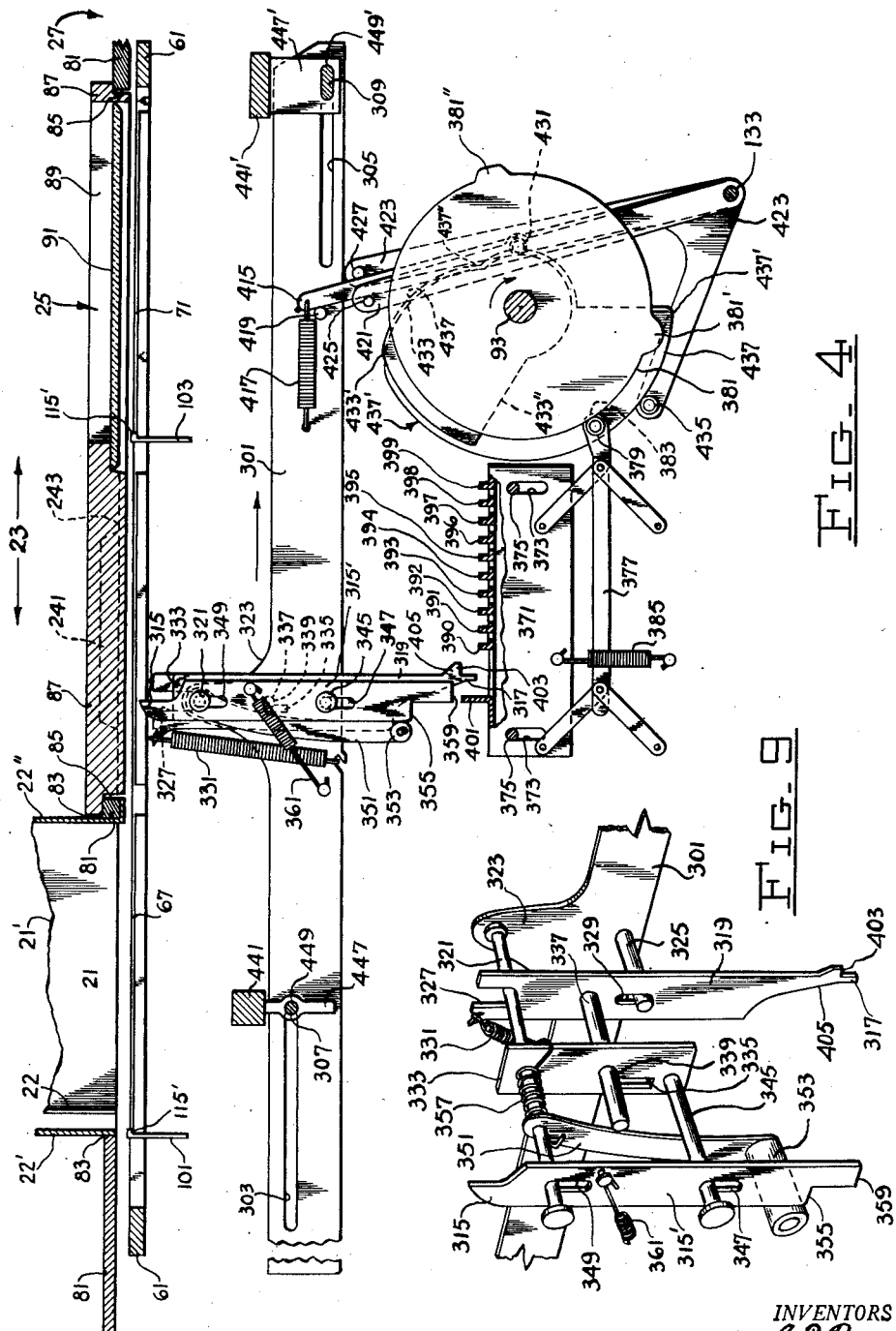

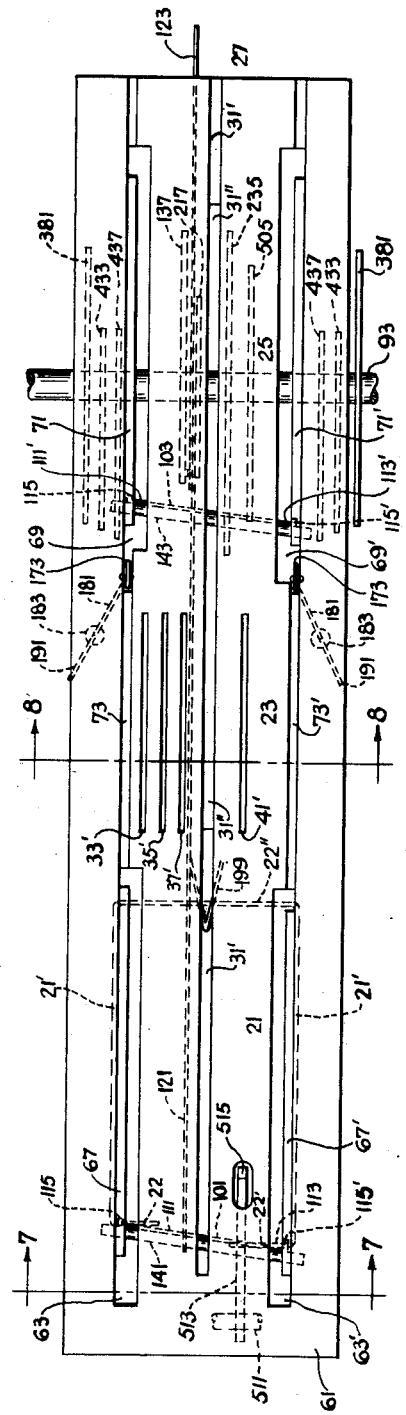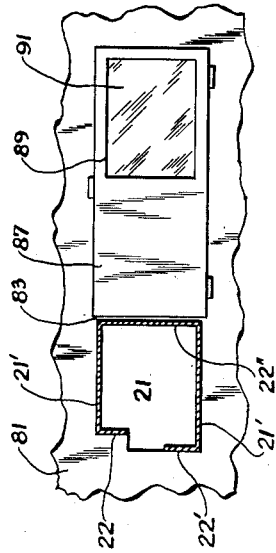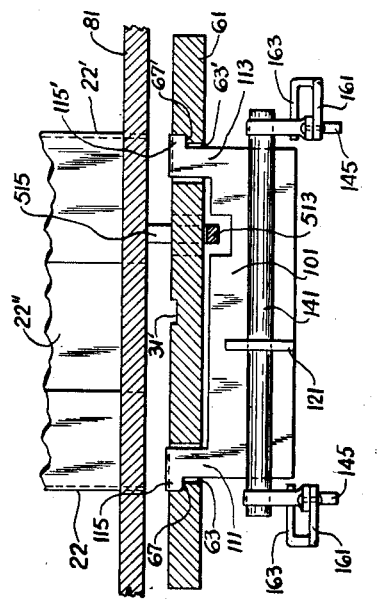

Aug. 21, 1956  C. E. BEACH ET AL  2,759,670
SENSING DEVICES FOR DATA RECORDS
Original Filed March 14, 1950  7 Sheets-Sheet 6

INVENTORS
C. E. Beach
WILLIAM P. MUNGER-DECEASED
MARY C. MUNGER-EXR'X.
BY C. E. Beach
HER ATTORNEY

United States Patent Office 2,759,670
Patented Aug. 21, 1956

2,759,670

SENSING DEVICES FOR DATA RECORDS

Clarence E. Beach, Binghamton, N. Y., and William P. Munger, deceased, late of Binghamton, N. Y., by Mary C. Munger, executrix, Washington, D. C., assignors to Robert Russell Stratton, Binghamton, N. Y.

Original application March 14, 1950, Serial No. 149,542, now Patent No. 2,704,187, dated March 15, 1955. Divided and this application June 30, 1953, Serial No. 364,982

23 Claims. (Cl. 235—61.11)

This invention relates to sensing devices for data records, and is a division and continuation-in-part of copending application, Serial No. 149,542, filed March 14, 1950, now Patent No. 2,704,187, which had for its primary object the provision of new and improved apparatus of the aforementioned character.

It has been proposed that, in places of business such, for example, as retail food stores, data records shall be associated with various units of merchandise, and one or more devices provided for sensing or analyzing such records when presented thereto, whereby to ascertain the amount which should be paid for any unit separately sold or the sum of the prices of any group of such units sold in a single transaction; to the end that such unit price or sum of unit prices may be collected from the purchaser, and that all needful and desirable records will be made and tabulations of such records will be effected.

In the interests of brevity and convenience, such records will at times be hereinafter referred to as "tablets" and, correspondingly, the term "analyzers" will be applied to devices or machines which provide for sensing indicia of such tablets and causing ascertainment, display, recordal, classification, and/or distribution to totalizers, of significant matters represented by such indicia.

In the course of the aforesaid proposed use, such tablets would, under many circumstances, be subject to handling by stock-men, clerks, checkers and cashiers, and—most serious of all—by customers.

Analyzing devices for tabulating machines heretofore available are incapable of dependably effecting the intended scanning of tablets or cards having no greater sturdiness than cards usually heretofore provided for analyzing devices, in the event that such tablets have become damaged through exposures to handlings by promiscuous persons; especially when exposed to handlings of persons who would have an interest in causing unintended analyzer functioning.

In this connection, it should be remembered that it has been found needful that cards, such as heretofore provided for similar analysis, shall be so stored and handled as to minimize opportunity for absorption of moisture, or else that excessive moisture shall be expelled therefrom before processing in an analyzing or sensing mechanism (even for guarding against wide variations in atmospheric humidity); as well as being protected against exposure to handling by unskilled persons or by those hostile to dependable attainment of intended scanning results.

In contrast with such protection and safeguarding, many of the conditions of tablet uses, such as those for which this invention is particularly intended, not only involve exposure to moisture, deformation and mutilation of edges, and to handling by untrained and disinterested persons, but also involve handling by persons who might expect to profit by effecting alteration and mutilation of tablets, as, for example, to thereby effect recordal, indication and/or inclusion in totalizer results, of item prices less than those intended.

It is therefore an important object of this invention to provide, in analyzer machines or apparatus having sensing mechanism for response thereto, structural characteristics which will minimize opportunities for occurrence of improper or unintended response of such apparatus and mechanism when tablets are processed thereby which have been exposed to moisture, deformation and mutilation of edges, and/or have been handled by persons either untrained or who might expect to profit by causing unintended results incident to processing by the analyzer machines or apparatus.

It is a further object to provide (in analyzer machines or apparatus having sensing mechanism structure suitable for sensing tablets having perforated or cut-away, raised or depressed areas) for effecting intended ascertainment of intended data and display, recordal, classification and distribution of such data to totalizers.

It is another object to provide structure in analyzer machines or apparatus having sensing mechanism for response thereto, structures for receiving tablets of the aforementioned characteristics, whereby such tablets may conveniently and rapidly be stacked for consecutive responsive sensing in a manner which will assure presentation of each tablet, in its turn, in correct relationship with the sensing mechanism.

Convenience of dependable utilization and simplicity of construction, as well as durability and general ruggedness are other desirable features which have served as objects in the development of this invention.

Further objects and advantages of this invention will become apparent to those skilled in this art in the course of a study of the ensuing description, considered with reference to the annexed claims, and in the light of the accompanying drawings.

Practice of certain of the broader or more general features of this invention involves the use of processing or analyzing mechanism having one or more devices (one device for each order of data to be sensed) which devices are suited for sensing data expressed by the form and/or positioning of certain structural features of data record or token tablets to be sensed thereby; which structural features comprise obstructions or barriers situated in the paths of feeler members of respective sensing devices which paths are disposed substantially parallel with the faces of tablets during positioning thereof for scanning of the data expressed thereby. The determination of the nature of the data of each order being established by the extent of such movement which occurs prior to the stage thereof at which the feeler member encounters the barrier or obstruction.

More specific features of this invention, together with illustrative embodiments of the foregoing broader or more general features, are hereinafter described, and are shown in the accompanying drawings, wherein Figure 1 is a diagrammatic side elevational view of certain parts of a mechanism constructed in accordance with this invention for effecting analysis of data expressed by an intended type of tablet, certain parts being shown partly in section or more or less broken away;

Fig. 2 is a like elevational view of portions of the mechanism of Fig. 1 which serve for picking tablets from the magazine stack and for transporting them from the magazine to the location for sensing, and, subsequently, away from the location for inspection;

Fig. 3 correspondingly shows portions of the mechanism of Fig. 1 which serve to effect needed exactness of positioning of tablets during analysis, and for thereafter transporting them to an inspection position;

Fig. 4 similarly shows portions of the mechanism of Fig. 1 which serve for effecting sensing or analysis of tablets;

Fig. 5 is a plan view of the hinged cover over the sensing and inspection locations, and showing walls of the magazine stack in cross section;

Fig. 6 is a plan view of the deck plate 61;

Fig. 7 is a sectional view incidentally showing the impeller blades of the initial transport system taken approximately on line 7—7 of Fig. 6, certain parts shown in cross-section;

Fig. 8 is a fragmentary elevational view of portions of the mechanism of Fig. 1, looking rearwardly, taken approximately on the line 8—8 of Fig. 6, with certain parts shown partly in cross-section and more or less broken away;

Fig. 9 is an exploded view showing portions of the mechanism of Fig. 4;

Figure 10:
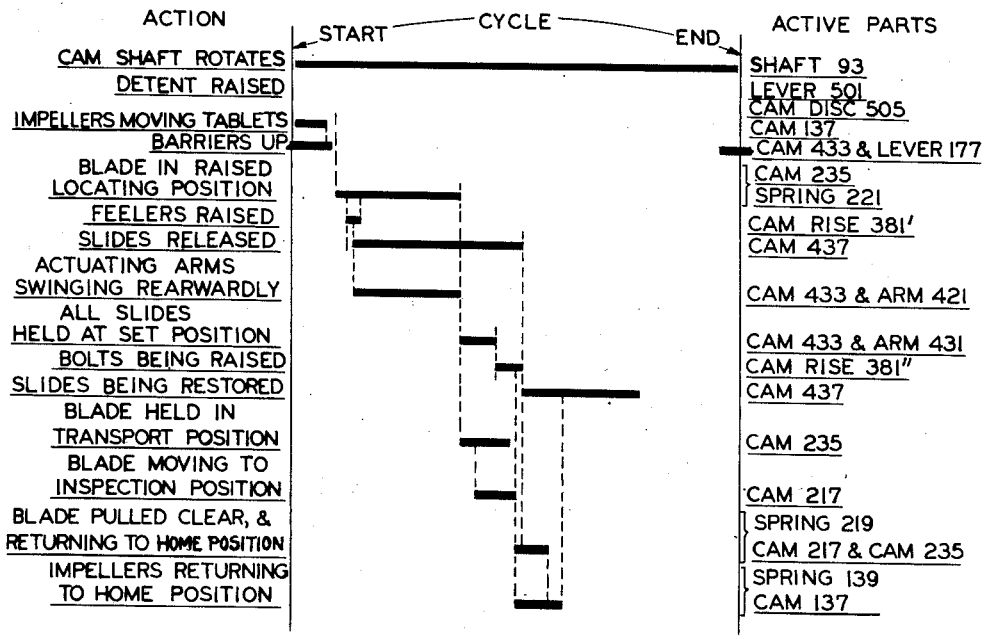
Figure 13:
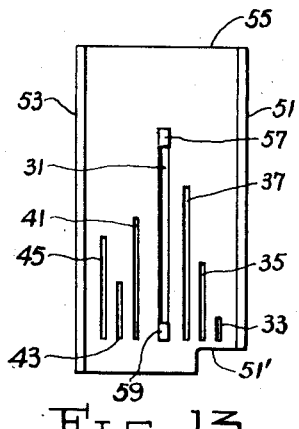
Figure 12:
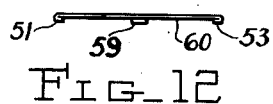
Figure 11:
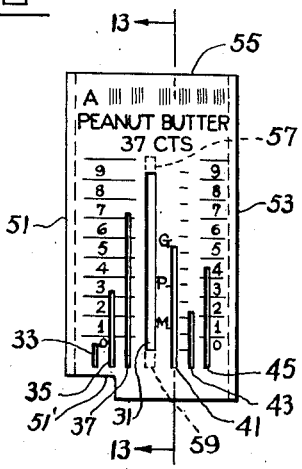
Figure 14:
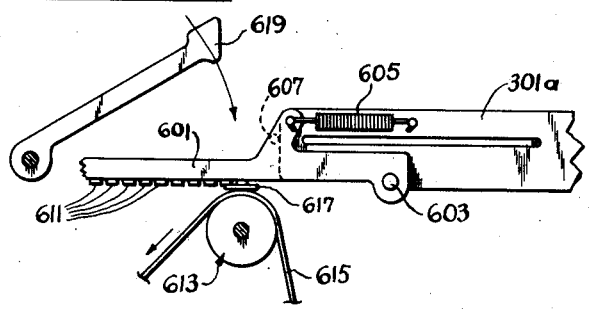
Figure 16:
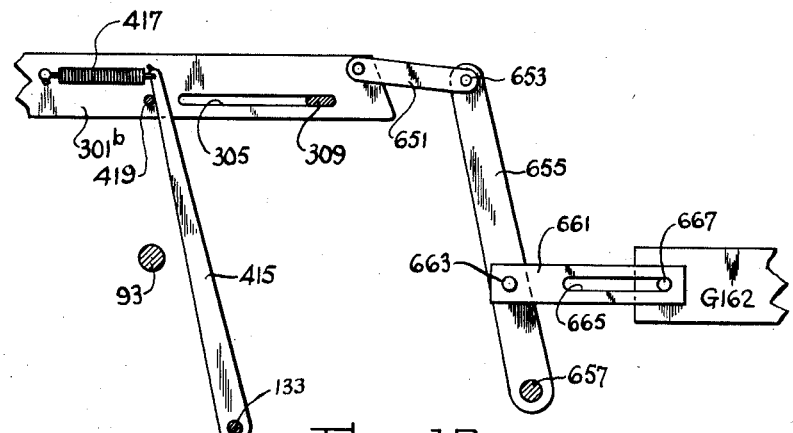
Figure 15:
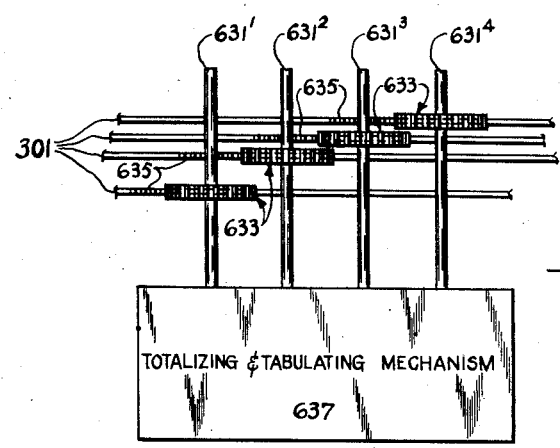
Figure 17:
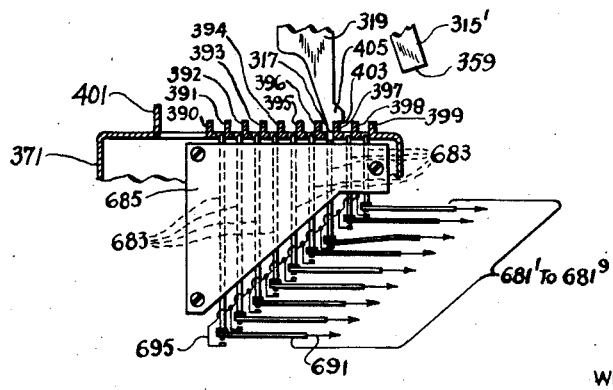

Fig. 10 diagrammatically shows the sequence of operations of the mechanism shown in Figs. 1 to 9;

Fig. 11 is a plan view of the upper surface of a form of tablet for the sensing of which the mechanism of Figs. 1 to 9 is suited;

Fig. 12 is an end elevational view of the tablet of Fig. 11;

Fig. 13 is a plan view of the under surface of the tablet of Fig. 11;

Fig. 14 is a fragmentary side elevational view illustrative of a manner of associating printing mechanism with the sensing mechanism of Fig. 4;

Fig. 15 is a schematic fragmentary representation of means for governing totalizing and/or tabulating mechanism responsive to movements of the slide bars of the sensing mechanism of Fig. 4;

Fig. 16 is a fragmentary schematic side elevational view of means for rendering certain types of cash register mechanisms responsive to the sensing mechanism of Fig. 4; and Fig. 17 is a fragmentary side elevational view, partly in cross-section, of a system of contacts whereby the sensing mechanism of Fig. 4 may be utilized for controlling electric contacts.

Figure 1:
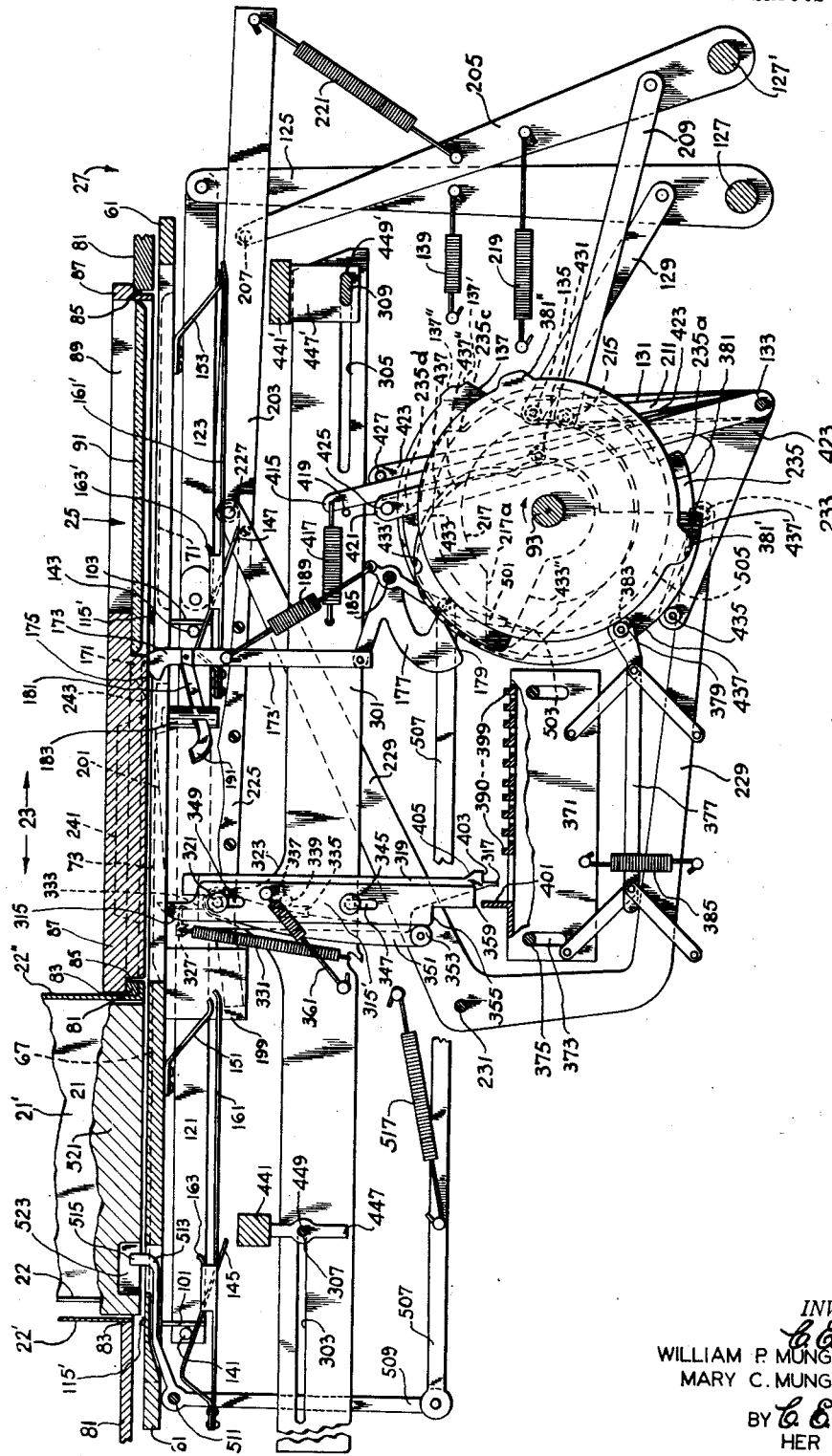

In order to show relationships between mechanism portions provided for accomplishment of diverse functions, Fig. 1 is a diagrammatic view from which it will be possible to trace the operation of the mechanism, as a whole, through its various steps. However, details of portions of the mechanism which are utilized for providing transportation of tablets from the magazine to the location for sensing and away from the location for inspection may be most readily understood by reference to Fig. 2 (this mechanism will at times be hereinafter referred to as an "initial transport system"); details of portions of the mechanism which are utilized for effecting exact positioning of tablets in the sensing position and for thereafter transporting such tablets to the inspection position are shown in Fig. 3 (this will at times be hereinafter referred to as a "positioning system"); and details of portions of the mechanism of Fig. 1 which are utilized for accomplishing the sensing of tablets are best shown in Fig. 4 (this will be hereinafter referred to as a "sensing mechanism").

It will be well to here note that references hereinafter made to a "forward" direction signifies a direction to the left, as viewed in Figs. 1, 2, 3 and 4, and that the end of the mechanism adjacent the left hand edge of these views is the front of the machine. A "rearward" direction denotes a direction opposite to the forward direction described hereinabove. An "inward" direction refers to a direction away from the viewed side of the mechanism, whereas the term "outward" will denote a direction outwardly from either side of a stated section line. An "upward" direction refers to a direction upwardly from the bottoms of these views toward their tops, while a "downward" direction denotes the opposite direction thereto.

The reference numerals which are applied to Fig. 1 correspond to the numerals applied to similar parts in the other views; however, the appearance of the parts may not seem identical, as far as shape is concerned, but their function is identical.

*General arrangement*

For the purpose of facilitating description of the embodiment of this invention which is shown by Fig. 1, reference will first be made to certain general characteristics of this embodiment.

A magazine is provided in which tablets may be stacked in preparation for effecting determinations of the nature of data which they are intended to express; to the end that such data may be suitably co-related and/or summarized.

This magazine is generally indicated at 21; and side walls 21', 21', 22, 22' and 22" are provided for enclosing tablets when here stacked (see also Fig. 5).

A location, in which tablets may be individually positioned for analysis or sensing of the data expressed thereby is generally indicated at 23; a location where such tablets may be positioned for visual inspection subsequent to sensing is generally indicated at 25; and a discharge area for receiving tablets after they have been removed from the inspection location is generally indicated at 27.

Although tablets having more or less diverse structural characteristics may be effectively scanned by mechanism constructed in accordance with this invention, as a matter of convenience, a type of analyzer will be herein described which is particularly suitable for scanning or effecting analysis of tablets having characteristics such as that shown by Figs. 11, 12 and 13.

For immediate purposes, it will be sufficient to mention that the type of tablets just referred to have a guide slot 31 intermediate and substantially parallel with the edges 51 and 53 thereof, together with six data expressing slots, of which slots 33, 35 and 37 are at one side of and substantially parallel with said guide slot, and the slots 41, 43 and 45 are correspondingly disposed at the other side of said guide slot. For the purposes of the present description, it is unnecessary to make detailed reference to the utilization of the data expressing slots 43 and 45.

The numeral expressing slots 33, 35 and 37 are of particular importance for the purposes of this invention. It will be noted that (as in the instance of slot 33) if no numerical value is represented, the length of the slot will be merely sufficient to receive the feeler 315, for a reason which will be hereinafter more fully described; while slots representative of numerical values are longer than slots which are not representative of any value, in extents representative of the numerical or other characteristics of data of the orders respectively expressed thereby. For example, slot 35 is three units longer than slot 33, and slot 37 is seven units longer.

For reasons which will be hereinafter more fully set forth, said edges 51 and 53, and material detached from portions of the slot 31 adjacent the ends 57 and 59 thereof, are here shown as folded under. Such folded under portions will be, at times, hereinafter referred to as "runners."

As best shown in Fig. 6, the front-end wall portion 22 of the magazine 21 is farther rearward than the wall portion 22'. The difference between the positionings of these wall portions corresponds with the difference between the lengths of the runners 51 and 53 of the tablet of Figs. 11 and 13; to the end that intended tablets can be stacked in the magazine only when positioning is what might be termed "right side up and right end to."

Again referring to Fig. 1, as well as Figs. 2 and 6, it will be seen that the deck plate 61 extends forwardly of the magazine 21, beneath the base of this magazine, past the sensing and inspection locations 23 and 25, and to the discharge area 27.

Channels 63, 63' are formed in the deck plate 61 parallel with and having their outer edges beneath the side walls 21', 21' of the magazine. It should be noted that the channels 63 and 63' extend forwardly from magazine end walls 22 and 22' respectively, and also extend diverse distances rearwardly from end wall 22''.

Tracks 67, 67' extend along the outer walls of the channels 63 and 63', respectively, for supporting the folded under edges of any tablet (such as that of Figs. 11 and 13) as is at any time positioned at the bottom of the magazine stack; these tracks are shorter than their associated channels 63 and 63'. The front ends of these tracks are situated at or in near alinement with the inner surfaces of the front walls 22 and 22', respectively, of the magazine.

These tracks extend rearwardly to the vicinity of the rear magazine wall 22''; and the channels 63, 63' extend suitable distances forwardly and rearwardly beyond the ends of their respectively associated tracks 67, 67' to extents and for reasons which will be hereinafter more fully explained.

Another pair of channels 69 and 69' are provided at the inspection location 25, and tracks 71 and 71' are correspondingly provided along the outer walls of these channels.

Slots 73, 73' connect the rear ends of the channels 63, 63', with the forward ends of the channels 69, 69' for the purpose of guiding runners 51 and 53 of tablets such as shown in Figs. 11 and 13 during transport of such tablets to, through and out of the sensing location.

The portion of the deck plate 61 at the location 23 has sensing slots 33', 35', 37' and 41' corresponding to tablet slots similarly numbered. These deck plate slots should be at least as long, and preferably a little longer than the maximum lengths which respectively associated tablet slots may be cut. A slot 31' is provided in the deck plate 61 in relative positioning to the slots 37' and 41' corresponding to that of similar tablet slots; however, the slot 31' extends beyond the associated sensing slots, under the magazine 21, through the sensing location 23 and the inspection location 25 to the rear end of the plate 61, and the portion 31'' of said slot 31' in the sensing and inspection locations extends entirely through the plate 61 (although the portions of the slot 31' forwardly and rearwardly of the portion 31'' may be mere shallow grooves); all for reasons which will be hereinafter more fully explained.

A cover or shell 81 is situated above and is somewhat spaced from the deck plate 61. This shell extends from the front of the machine around and past the magazine 21 to the rear of the machine, having an opening 83 for the magazine walls 21', 21', 22 and 22', and extending rearwardly from said magazine past the sensing location 23 and the inspection location 25.

The cover plate 87 extends rearwardly from the magazine wall 22'', past the inspection location 25; there being an opening 89 in said cover at the inspection location 25, which opening is equipped with a glass panel 91 through which any tablet there positioned may be viewed.

*Initial transport system*

The initial transport system comprises a primary picker or impeller plate 101 and a secondary impeller plate 103. When in action, portions of these plates are lifted in the forward portions of the channels 63, 63' and 69, 69', respectively, in front of the forward ends of their associated tracks.

As best shown in Fig. 6, the impeller plates 101 and 103 are set at an angle to the channels with which they are associated, to the end that the outwardly extending ears 115, 115 of the impeller blades 111, 111' (see Figs. 6 and 7) for engaging the shoulder 51' of the notch at the end of runner 51 of the tablet (the left hand side as viewed in Fig. 11 and the right hand side as viewed in Fig. 13) are positioned rearwardly with reference to the ears 115', 115' of the impeller blades 113, 113' which engage the longer or right hand runners 53 of the tablet; to the end that, when these blades act to propel a tablet, the side walls of which are parallel with the channels 63, 63' or the channels 69, 69', they will press equally against the ends of the two tablet runners, and thus keep the tablet in alinement with the channels provided therefor.

The bar 121 has the impeller plates 101 and 103 affixed thereto, as best shown in Figs. 2, 6 and 7. A link 123 (see Figs. 1 and 2) connects the rear end of the bar 121 with the free end of the arm 125, which arm is pivoted on shaft 127 and is connected by a link 129 with the free end of the arm 131, which arm is pivoted at 133.

A stud or roller 135 is situated at the junction between the ends of the link 129 and the arm 131, and extends into the path of the cam 137.

Stud 141 is situated adjacent the front end of the bar 121 and stud 143 is situated adjacent the rear end of said bar; said studs being preferably in contact with and welded or otherwise attached to the associated plates 101 and 103, respectively, for the purpose of re-enforcing said plates.

Curved, flat springs 145 and 147 are positioned in the paths of the studs 141 and 143, respectively, for urging the bar 121 toward the plate 61, as said bar approaches the forward end of its stroke; and the similar springs 151 and 153 are in the paths of said respective studs for urging said bar 121 downwardly, away from the plate 61, as said bar approaches the other end of its stroke.

A guide track 161 extends in the path of the stud 141 for supporting the forward end of the bar 121 while said bar is in its lower position, and a track 163 extends in the path of said stud 141 for restraining upward movement of the forward end of the bar 121 as it approaches the forward end of its stroke, and until said bar reaches a position permitting rise of the blades 111 and 113 forward of the ends of the tracks 67 and 67' (Fig. 6).

Tracks 161' and 163' are correspondingly associated with the stud 143.

From the foregoing it will be seen that when the cam 137 is in its rest position (as shown in Figs. 1 and 2), the spring 139, acting through the arm 125 and the link 123, will retain the bar 121 in its forward position; and the springs 145 and 147, acting through the studs 141 and 143, will retain said bar in its elevated position; so that the outwardly extending ears 115, 115' of the blades 111 and 113 will be positioned slightly above the tracks 67 and 67', and the outwardly extending ears 115, 115' of the blades 111' and 113' will be positioned slightly above the tracks 71 and 71'.

If, now, there are tablets in the magazine 21 and in the inspection location 25, and the drive shaft 93 is rotated clockwise, the cam 137, acting through the roller 135, link 129, arm 125 and link 123, will move the bar 121 rearwardly. The outwardly extending ears 115, 115'' of the blades 111, 111', 113 and 113', being above their respectively associated tracks, at the commencement of such movement, will pass over the upper surfaces of these tracks. These blades will therefore engage the repectively associated edges of the lowest tablet in the stack and will move such tablet rearwardly.

Just before the rearward movement of the bar 121 reaches a point such as will carry the said outwardly extending ears beyond the rear ends of their respectively associated tracks, the dwell 137' will permit a slight further rotation of the cam 137 without causing further rearward movement of said bar. However, further rotation of said cam 137 will carry the hump 137'' into engagement with the roller 135, and thus cause sufficient additional rearward movement of the bar 121 to carry the outwardly extending ears 115, 115' of the blades 111, 113, 111' and 113' rearwardly of their respectively associated tracks; whereupon, the springs 151 and 153 will cause the bar 121 to move downwardly until such movement is arrested by engagement of the studs 141 and 143 with the rear ends of the tracks 161 and 161'. The plates 101 and 103 will thus be positioned with the outwardly extending ears 115, 115' of their impeller blades below the deck plate 61.

At the conclusion of such action, the tablet which was withdrawn from the bottom of the stack in the magazine 21 will have moved to the sensing location 23, and the tablet which had been in the inspection location 25 will have been carried into the discharge area 27.

If the rotation of the shaft 93 is sufficiently rapid to impart considerable momentum to tablets when moved from the magazine 21 to the sensing location 23, there will be more or less likelihood that, in the absence of detent structure, tablets so moved will objectionably overrun their intended travel. For operating conditions such that speed of shaft 93 might cause such overrunning of tablets, detent structure should be provided for preventing such overrun and for minimizing tendency for tablets to rebound when their rearward movement has been arrested by such detent structure.

Recesses such as the recess 171 shown in Fig. 1 are provided in the under surface of the cover plate 87 above the rear ends of the slots 73, 73' (see also Fig. 6), and barriers 173, 173 are movable into these slots.

When said barriers are in their elevated positions the forward portions of the upper surfaces 175, 175 of these barriers will be situated below the surfaces of their associated slots 73, 73', and said surfaces, slanting upwardly, will extend into said recesses 171, 171; hence there will be tapered openings into which the leading ends of tablet runners 51 and 53 may become wedged, to prevent forward rebound when rearward movement of tablets is arrested by said barriers.

The recesses 171, 171 are appreciably wider than the thickness of the blades of the barriers 173, 173 so that these blades are unlikely to become wedged in said recesses, even in the presence of shreds of tablet material.

Inasmuch as the supports and operating structures for the barriers 173, 173 are identical, but one will be here described.

Referring to Fig. 1, a bar 173' extends from the barrier 173 to one arm of the lever 177. A cam surface 179 is formed in the other end of said lever, for engaging the cam 433. Said lever 177 is pivoted on the stud 185.

A lever 181 is attached to the upper portion of the bar 173' and to the adjacent supporting post 183.

A stop tail 191 of the lever 181 is so formed and positioned that when the barrier 173 is in lowered position (i. e., out of the path of tablet movement) the end of the stop tail 191 will rest against the lower surface of the plate 61, so as to prevent excessive downward movement of the bar 173' and the lever 177.

The forms and the positionings of the cam surface 179 and the cam 433, with reference to the cam 137, are such that said barriers 173, 173 are in the path of tablet travel beyond the sensing location 23, so long as the shaft 93 and parts rotating therewith are in their home positions, and such that said barriers will be withdrawn from such tablet path by the spring 189 whenever a tablet has stopped in the sensing location after having been moved from the magazine.

*Positioning system*

The details of the positioning system are best shown in Fig. 3, and comprise a locator blade 201, which is carried at the forward end of a bar 203, which blade is utilized for effecting accurate positioning of tablets for and during sensing of the data slots therein, and for thereafter moving tablets from the sensing location 23 to the inspection location 25.

Said bar 203 is pivotally connected by the stud 207 to the arm 205, which arm may be pivoted on the shaft 127' and is connected through the link 209 with the arm 211.

Said arm 211 swings on the aforementioned pivot 133 and carries a roller 215 which extends in the path of the cam 217.

A spring 219 urges movement of the arm 205, acting through the link 209 to keep the roller 215 in engagement with the cam 217; and a spring 221 is applied between said arm 205 and the rearwardly projecting end of the bar 203 so as to urge upward movement of the forward end of said bar to carry the blade 201 upwardly.

A track 225 is carried by the forward portion of the bar 203, and a roller 227 projects in the path of said track for governing the extent of upward movement of the blade 201 responsive to the spring 221.

Said roller 227 is carried by an end of a U-shaped lever 229, fulcrumed at 231, and having a second roller 233 at the other end thereof; which roller extends in the path of the cam 235.

Said cams 217 and 235, together with the cams 381, 381, 433, 433, 437, 437 and 137, and the disk 505 (see Fig. 8) are carried by and rotate with the shaft 93.

The relative formations and positionings of cams thus far referred to, which rotate with the shaft 93, are such that when the entire mechanism is at rest, the various parts occupy the positions shown in Figs. 1, 2, 3, 4, 6, 7 and 8.

As the shaft 93 rotates, clockwise, from rest position, the cams 433, 433 (at respective sides of the mechanism) maintain the barriers 173, 173 in the path of tablets immediately behind the sensing location 23. Cam 137 causes the impeller plates 101 and 103 to carry the outwardly extending ears 115, 115' of their respectively associated impeller plates along the upper surfaces of the tracks 67, 67', and 71, 71' until said plates drop just beyond the rear ends of said tracks.

The further rotation of the shaft 93 then causes the outer periphery 235$^a$ of the cam 235 to be withdrawn from the path of the roller 233, then permitting the U-shaped lever 229 to swing counter-clockwise about its fulcrum 231, as the track 225 is carried upwardly by the bar 203 responsive to the urge of the spring 221. Such upward swing of the forward end of the bar 203 will carry the locator blade 201 toward and into the recess 241 which is formed in the cover plate 87 for receiving said blade (Fig. 3) for the purpose of exactly locating the tablet prior to and throughout analysis or sensing of the data slots therein, as hereinafter more fully explained. During such upward movement of said blade 201, a forwardly extending portion thereof will be accurately held against lateral displacement in the guide block 199 (best shown in Fig. 6).

After the completion of such sensing action, the rise 235$^c$, acting through the lever 229 and roller 227 swings the bar 203 and with it the blade 201 downwardly, so as to partially withdraw said blade from the recess 241, but not fully withdrawing said blade from the guide slot 31 of such tablet as may then be in the sensing location.

Still further rotation of the shaft 93 will cause the rise 217$^a$ of the cam 217 to act through the roller 215, link 209 and arm 205, to carry the bar 203 rearwardly; the upper edge of the blade 201 meanwhile traveling along the groove 243 in the lower surface of the plate 87 and thence along the lower surface of the glass panel 91 until such tablet as is then engaged by this blade is brought into the inspection location 25, whereupon, the rise 235$^d$ of the cam 235 will act through the roller 233 and the lever 229 to swing the bar 203 downwardly, and thereby effect complete withdrawal of the blade 201 from the tablet then supported upon the tracks 71, 71'.

Ensuing rotation of the cam 217 will withdraw the rise 217$^a$ from the path of the roller 215, whereupon the spring 219 will act through the arm 205 to cause the blade 201 to be carried back to its starting position; the contour of the upper surface of the track 225 meanwhile co-acting with the roller 227 to prevent the bar 203 from swinging upwardly, responsive to the spring 221, to an extent which would carry the blade 201 into the path of tokens resting upon the upper surface of the plate 61.

Incident to the aforesaid forward movement of the bar 203 a forwardly extending portion of the blade 201 entered the open end of the V-shaped guide block 199 (best shown in Fig. 6) to assure lateral stabilization of said blade when it is positioned in the slot of an associated token, as hereinbefore explained.

Sensing mechanism

Sensing mechanism units are provided for each of the orders of data for which tablets are to be analyzed or scanned. Inasmuch as the units for the various orders of data are substantially identical, but one of such units will here be described in detail.

As best shown in Fig. 4, the units provided for each of the orders of data comprises a slide bar 301, having slots 303 and 305 adjacent respective ends thereof, for receiving supporting bars 307 and 309 respectively; which supporting bars extend across the machine and pass through all of the slide bars.

Carried by each of the slide bars 301 is a feeler 315 and a bolt 317.

The manner of the mounting of this feeler and bolt upon the slide bar 301, and the character of the mechanism functionally inter-relating one and the other of these parts will be best understood by reference to Fig. 9 in which these parts are indicated in a relationship which is spread out or "exploded" from that in which they are actually assembled.

A shaft 321 is fixed in the upwardly extending ear 323 which forms part of the slide bar 301, and a stud 325, which is in substantially vertical alinement with the shaft 321, is fixed in the lower part of said slide bar.

The bolt 317 is formed in the lower end of the bar 319, which bar has slots 327 and 329 for receiving the shaft 321 and the stud 325, respectively; so that said bolt may move vertically, with reference to the slide bar 301, to the extent permitted by the slot 329. A spring 331 urges downward movement of said bolt 317.

An arm 333 is journaled on the shaft 321. Said arm has a slot 335 formed therein, and a stud 337 carried by the bolt 317 moves freely in this slot.

The formation of said slot 335 is such that when the bolt 317 (see also Fig. 9) is in its fully elevated position, the free end of the arm 333 may be swung by the spring 357 (to the left as viewed in Fig. 9) so as to bring the shoulder 339 in the path of downward movement of the stud 337 and thus serve to retain the bolt 317 in its elevated position.

Said slot 335 is further so formed that, when the arm 333 has moved to withdraw the shoulder 339 from the path of the stud 337, said stud will act to further swing said arm toward the right, incident to the downward movement of the bolt 317, for a purpose which will be hereinafter more fully explained.

A stud 345 is fixed in the arm 333 near the free end thereof. This stud extends through a slot 347 in the lower part of the feeler bar 315'; there being a similar slot 349 in the upper portion of said feeler bar through which projects the outer end of the shaft 321. Hence, the length of the slots 347 and 349 determine the extent of substantially vertical movement of the feeler 315, with reference to the slide bar 301.

A second arm 351 is fulcrumed on the shaft 321, and is situated between the arm 333 and the feeler bar 315'.

The free end of the arm 351 extends downwardly past the stud 345, and carries a roller 353 for engagement with the shoulder 355 formed in the lower portion of the feeler bar 315'; said roller being so situated that, when positioned beneath said shoulder 355, the bar 315' will be maintained in its fully elevated position.

A spring 357 (shown only in Fig. 9) is so applied as to urge movement of the arm 351 to carry the roller 353 into the path of the shoulder 355, while urging movement of the arm 333 to carry the shoulder 339 into the path of the stud 337. The spring 361 urges left swing of bar 315'.

A rack member generally indicated at 371 has vertical slots 373, 373 formed therein for sliding freely over the posts 375, 375 for permitting vertical movement of said member.

A toggle system comprising a pair of substantially horizontal bars 377 is connected to the member 371 for governing the movement of said member in a vertical plane.

Rollers 379, 379 carried by said bars are disposed in the paths of the cams 381, 381, which cams rotate with the shaft 93.

A pair of extensions, such as 383 are carried by each of the bars 377, at respective sides of the cams 381, 381, for keeping the associated rollers 379, 379 in the paths of said cams, notwithstanding possible weaving of the toggle system of which the bars 377 form parts.

A series of rack bars 390, 391 . . . 399 are carried by the member 371. These bars extend across the paths of the bolts 317 of the various sensing mechanism units.

Projection 401 carried by the member 371 also extends across the machine engaging, at times, the lower ends 359 of the feeler bars 315' of the various sensing mechanism units.

A series of slide bar actuating arms, such as 415, 415 (one for each of the slide bars 301) are journaled at the pivot 133, for independent oscillation. Springs, such as 417, so connect the end of each arm 415 with its associated slide bar as to urge rearward movement of the slide bar with reference to its associated arm.

Studs such as 419, are carried by each of the slide bars in the path of their respectively associated arms 415, 415 for limiting the extent of relative movement between said arms and said bar responsive to the spring 17.

A pair of arms such as 421, 421 and a pair of V-shaped levers such as 423, 423 are independently journaled in suitable spaced relationship on the pivot 133. But one of said arms and one of said levers are shown in Figs. 1 and 4.

A bail bar 425 carried near the free ends of the arms 421 extends in front of the arms 415 of the various units, and a similar bail bar 427, carried by the free ends of the vertically disposed arms of the V-shaped levers 423, 423, correspondingly extend behind said arms 415 of the various units.

Rollers 431, 431 carried by the arms 421, 421 are situated in the paths of the cams 433, 433, and rollers 435, 435 carried by the forwardly extending, lower arms of the V-shaped levers 423, 423 are situated in the paths of the cams 437, 437.

Comb-like bridge members 441 and 441' serve to support and stabilize the slides 301. The respective upper or main body portions of said members are anchored to the frame structure, as by dowels (not shown).

Comb-tooth-like strips such as 447, 447' depend from the upper or main body portions of said members or main body portions of said members, at respective sides of each of the slides 301. Each of the strips 447 has an opening 449 therethrough for snugly receiving the bar 307; and the strips 447' have corresponding openings 449' for similarly associating them with the supporting bar 309.

It is preferable that the portions of the strips 447 and 447' situated adjacent upper and lower edges of the slide bars 301 be thicker than portions situated therebetween, so that the guiding action supplied by these strips will be applied near the upper and lower edges of said slide bars.

The form of the members 441 and 441', as just described, serve both to prevent twisting movement of the slide bars 301 and to stabilize the supporting bars 307 and 309.

Sensing activity starts immediately following accurate positioning of the tablet, that is, when the blade 201 has moved up through the tablet slot 31, responsive to the spring 221, at the time when the cam 235 permits upward movement of the roller 233.

At the commencement of sensing activity, the brief rises 381', of the cam 381, will act through the toggle bar 377 to raise the rack member 371, and thereby bring the projection 401 into engagement with the lower ends 359 of each of the feeler bars 315', and thereby carry the feelers 315 of each of the sensing mechanism units upwardly through the respectively associated slots of the tablet then positioned for sensing.

After the brief rises 381' have withdrawn from the paths of the rollers 379, the rack member 371 will be moved downwardly by the spring 385, and the ensuing rotation of shaft 93 will then withdraw the outer peripheries 437' of the cams 437 from the paths of the rollers 435, thereby permitting the upwardly extending arms of the levers 423 to swing rearwardly, whereupon the cams 433 will act through the rollers 431 and associated parts to cause the slide bar actuating arms 415 to swing rearwardly.

During such rearward movement of said arms 415, their respectively associated slide bars 301 will be moved rearwardly, responsive to their springs 417, until their feelers 315 encounter the barriers presented by the rear walls of the data slots associated therewith.

Thus, assuming that a tablet is being sensed which has slotting which corresponds with that shown in Fig. 11, upon commencement of its rearward movement, the dollar's feeler 315 will immediately encounter the rear wall of its associated slot. The top of this feeler will then no longer move rearwardly with its associated slide bar, but its bar 315' will rock on its shaft 321 and carry the stud 345 therewith; thereby to swing the arm 333 so as to withdraw its shoulder 339 from support of the stud 337 carried by the bolt 317. Whereupon, the spring 331 will snap the bolt 317 downwardly, in front of the rack tooth bar 390, and thus arrest the rearward movement of its associated slide bar 301 in what has been predetermined as its "zero" position.

After the rearward movement of such slide bar 301 has thus been arrested, the ensuing rearward movement of its actuating arm 415 will cause stretching of its spring 417.

The rearward movements of the slide bars of the other sensing mechanism units will be correspondingly arrested, in accordance with the positionings of the barriers presented by the rear walls of the slots which they are sensing.

The next ensuing rotation of the shaft 93 will cause the rise 217$^a$ of the cam 217 to act through the roller 215 and associated parts to move the blade 201 rearwardly, thereby to transport the tablet just sensed from the sensing location 23 to the inspection location 25; whereupon, the rise 235$^d$ of the cam 235 will act through the roller 233 and associated parts to move the blade 201 below the path of tablet travel.

After the slide bar actuating arms 415 have reached and been retained in their extreme rearward positionings for a suitable time—as for permitting printing, totalizing and/or other resultant operations—the support of the cams 433, 433 will be withdrawn from their rollers 431, 431, thereby to permit the arms 421, 421 to move forwardly in response to urge imparted thereto by the various springs 417 acting through their respectively associated arms 415; said arms 415 thus being permitted to move forwardly until they encounter their respectively associated studs 419; whereupon said springs will cease to urge relative movement between their associated slide bars 301 and arms 415.

Further rotation of the shaft 93 will cause the rises 381" to act through the rollers 379 to move the rack member 371 upwardly.

Such upward movement of said rack member 371 will cause each of the bolts 317 to be moved to its fully elevated position by engagement of the lower surface 403 of its projection 405 by the one of the rack bars 390 . . . 399 which arrested the rearward movement of the associated bolts, in the course of preceeding operation.

Such lifting of the bolts 317 will carry their respective studs 337 above the shoulders 339 in their associated slots 335, whereupon their arms 333 will swing responsive to their springs 357 to cause said shoulders to be positioned for retaining said bolts 317 in their elevated positionings.

After bolts 317 have thus been lifted and locked in their elevated positions, the rise 381" will be withdrawn from the path of the roller 379 and the spring 385 will then return the rack member 371 to its lower or home position. The cam rises 437" will then act through the rollers 435, the V-shaped levers 423 and the bail bar 427 to return all of the arms 415 and their associated slide bars to their home positions.

During or immediately following return of the arms 415 to their forward or home positions, as just described, the rise of the cam 217 is withdrawn from the path of the roller 215, thus permitting the spring 219 to cause the arm 205 to move the bar 203 and the blade 201 to their forward or home positions.

During, or immediately following such home-positioning of the blade 201, the rise of the cam 137 will be withdrawn from the path of the roller 135, thus permitting the spring 139 to act through the arm 125 and link 123 to move the bar 121 forwardly. However, the occasion and rate of such forward movement of the bar 121 should be such that the impeller plate 103 will not overtake the blade 201, during the aforesaid forward movement of this blade.

During the forward movement of the bar 121 just referred to, and near the conclusion thereof, the studs 141 and 143 will engage and be urged upwardly by the upper surfaces of the springs 145 and 147; so that, when the ears 115, 115' (Fig. 7) have passed beyond the forward ends of their tracks 67, 67' and 71, 71', said studs will be moved upwardly, by their associated springs, and will therefore cause lifting of the bar 121 such as will carry said ears to a plane slightly above that of their respectively associated tracks; further upward movement of said ears being then restrained, as by engagement of the top surfaces of said impeller plates with the lower surface of the deck plate 61.

*Start control*

In order to resist start of a cycle of rotation of the shaft 93 at a time when there are no tablets in the magazine 21, various forms of mechanism may be provided, embodying one or another of various structural arrangements which are well-known to those skilled in this art.

As schematically representive of such arrangements, Fig. 1 shows a detent lever 501, fulcrumed in or near the bearing 185, and having its free end in the path of the radial face 503 of the disk 505; which disk is fixed on the shaft 93.

A link 507 connects said lever 501 with the free end of the arm 509, which arm is pivoted at 511.

A finger 513, also pivoted at 511, moves with the arm 509.

The upturned end 515 of the finger 513 extends upwardly from said finger through the plane which would be occupied by a tablet at the bottom of the magazine 21; a spring 517 urges movement of the various parts to carry said end 515 above such tablet level, so that the free end of the lever 501 will be disposed in the path of the radial face 503 of the disk 505. The urge of the spring 517 is supplemented by that of the spring 189, one end of which is connected to the arm 501 above its pivot 185; the other end of said spring being connected to the bar 173' so as to urge movement thereof to carry the barrier 173 below the tablet path.

A weight, fragmentally indicated at 521, has a recess 523 formed therein for receiving the finger end 515 when in elevated position.

Disposal of sensed data

Data sensing by mechanism such as thus far described may be utilized for effecting printed records, display by means of targets, entry in totalizing or tabulating mechanism, and/or causing useful response of various other mechanisms.

Examples which are illustrative but not comprehensive of opportunities for such utilizations are presented in Figs. 14, 15, 16 and 17.

Printing of numerical or other characters expressive of sensed data may be accomplished in accordance with any of several well-known methods. One such method is schematically shown in Fig. 14, in which printing mechanism is represented in association with the forward end of a slide bar 301ª, which bar is similar to the bars 301 hereinbefore described in detail.

Such printing mechanism comprises a type bar 601 which is pivoted to the slide bar 301ª at 603. A spring 605 urges upward movement of the free end of the bar 601; the extent of such movement being limited by a pin 607 carried by the type bar for engagement with the front edge of the bar 301ª.

The lower surface of the bar 601 is equipped with type 611, for printing numerical or other characters representative of sensing positionings of the bar 301ª.

A platen 613 is mounted below the type bar 601, and a paper 615 and an ink ribbon 617 pass between the upper surface of the platen 613 and the type bar 601.

A printing hammer 619 is mounted above the type bar 601, which hammer may be operated by suitable mechanism (not shown).

In use, after the slide 301ª has been positioned incident to sensing of a tablet, a suitable one of the type 611 will be positioned in printing relation to the paper 615, and the hammer 619 will cause printing in the usual manner.

Persons skilled in this art may readily select one or another of various well-known mechanisms for accomplishing desired totalizing and/or tabulating results, as well as for effecting display of such results by means of targets.

An example of well-known mechanism, more or less of which may be readily adapted for use in connection with this invention, is shown in Patent No. 2,226,919, dated December 31, 1940, to Gubelman.

In order to simplify the present disclosure and to set forth more clearly the improvements represented by a number of the broader aspects of the present invention, certain of the parts of the aforesaid patent are schematically represented in drawings to which reference is about to be made, the disclosures of the aforesaid patent being incorporated herein by reference.

One arrangement for rendering certain well-known forms of totalizing and tabulating mechanism responsive to scanning of tablets accomplished in accordance with this invention is shown in Fig. 15, which presents a plan view of slides such as the slides 301 contemplated by Figs. 1, 2 and 6, there being slides representative of dollars, dimes, cents and departmental segregations.

A series of shafts $631^1$, $631^2$, $631^3$ and $631^4$, each has a gear 633 fixed thereon, which gears engage rack teeth 635 . . . 635 formed in the upper edges of the respective slides 301.

Totalizing and tabulating mechanism generally indicated at 637 is associated with said shafts in a manner such that totalizing and tabulating results accomplished by said mechanism will be governed thereby. Inasmuch as details of totalizing and tabulating mechanism suitable for use with sensing mechanism constructed in accordance with this invention are well-known, such details are not shown in the accompanying drawings, and will not be herein further described.

Another arrangement whereby portions of the mechanism of said Gubelman patent may be utilized in connection with sensing mechanism constructed in accordance with this invention is schematically shown in Fig. 16, in which the rear end of a slide bar 301ᵇ is shown, connected through a link 651 which is hinged at 653 to the free end of an arm 655. This arm is pivoted at 657.

A slotted link 661 has an end thereof connected to the arm 655 at 663, and has a slot 665 which slides freely over the pin 667; which pin is fixed in the slide G162.

Said slide G162 may be one of the slides shown in said Gubelman patent which bears a similar number.

It is believed that it will be evident that, with the arrangement shown, slide bars such as G162 of the Gubelman mechanism may be governed by slides 301ᵇ, which are constructed and operate in accordance with the present invention, in a manner analogous to that in which corresponding slides are governed and operate for governing target displays and totalizing and tabulating mechanisms in accordance with the Gubelman patent.

The structure shown in Fig. 17 is one of the many which may be utilized in the practice of this invention for electrically controlling various related mechanism such, for example, as signal lamps or annunciators.

Stacks or groups of contacts such as generally indicated at $681^1$ . . . $681^9$ are provided for each order of data to be sensed pursuant to this invention; there being a movable contact for each data designation.

As shown, said group of contacts $681^1$ . . . $681^9$ includes a contact for each numeral from 1–9, inclusive. It should be obvious that, if desired, there could be another and similar contact representative of the numeral zero.

There is an actuating bar such as 683 for each of said movable contacts. Said bars are suitably supported by and freely movable through, a block such as 685, and the upper ends of said bars project into the openings between adjacent rack bars (as, for example, between the horizontal portion of bar 391 and the vertical portion of bar 392) the upper ends of said bars being slightly below the upper surfaces of the horizontal portions of said rack bars.

The lower portion of the bolt 317 is so formed that it may pass between the horizontal portion of one of said rack bars and the vertical face of the adjacent rack bar, for the purpose of depressing the actuating bar 683 which is positioned in the opening between such bars, for effecting actuation of the associated contact.

A projection 405 is provided on the bolt 317 so that the surface 403 of said projection may receive the upward thrust of an associated rack bar when the member 371 is elevated, responsive to the rise 381″ of the cam 381, after a sensing impulse has been formulated incident to the operation of the mechanism, as hereinbefore described in detail.

There is a comparatively stationary contact in the path of actuation of each of the movable contacts of the group 681. Said movable contacts are connected to individual conductors, such as the one of the conductors 691 which is shown as extending from the movable contact $681^1$, for the position representing the numeral 1.

The stationary contacts are shown connected to a common return conductor 695, although it will be understood that, if for any reason it is desirable, individual conductos could be provided for respective ones of said stationary contacts.

The drawing shows the bolt 317 positioned against rack bar 397, and holding in depressed position the actuating bar 633 which has acted to close the contacts representative of the numeral 7.

Operation—Figs. 1–10

Actuation of the cam shaft 93 may be accomplished by the use of a hand crank, or a motor may be associated with said shaft through suitable connecting mechanism such that its power will be applied through a single cycle clutch, or such a motor may be started by suitable controlling mechanism and automatically stopped at the end of each resultant cycle.

Inasmuch as many suitable types of such motor actuating mechanisms are well-known and form no part of this invention, they are not shown in the accompanying drawings nor here described in detail.

In Figs. 1, 2, 3 and 4 the various parts are shown in home or unoperated positions; the detent lever 501 being in the path of the radial face 503 of the disk 505, thus preventing rotation of the shaft 93; the barriers 173, 173 being retained in their raised positions by the cam 433; the ears 115 and 115' (best shown in Fig. 7) are positioned near the forward ends of their respectively associated tracks and slightly above the upper surfaces of tracks 67, 67' thereof. Said barriers are here pressed upwardly by engagement of their studs 141 and 143 by their associated springs 145 and 147, against which they are forwardly urged by the spring 139, acting through the arm 125 and associated parts.

The blade 201 is retained in its forward position by the spring 219, and is held in its lowered position by the outer periphery 235ᵃ of the cam 235, acting through the roller 233 and associated parts. The slides 301 are retained in their forward positionings by the cams 437, 437, acting through the rollers 435, the levers 423, the bail 427, and through their respectively associated arms 415. The feelers 315 are retained in their perpendicular positionings by their springs 361; and are also retained in their lowered positionings by said spring 361.

When one or more tablets have been placed in the magazine 21, and the weight 521 has been applied thereto, the lower one of such tablets will act through the end 515 to cause the finger 513 to be swung downwardly. This will cause the arm 509 to act through the link 507 to swing the detent lever 501 out of the path of the radial face 503 of the disk 505, and thus permit rotation of the shaft 93.

Rotation of said shaft 93 will now cause the cam 137 to act through associated parts, to move the ears 115 and 115' of the impeller plates 101 and 103 rearwardly along the upper surfaces of their respectively associated tracks 67, 67', 71 and 71'; thereby to withdraw the bottom tablet from the magazine 21 and move same toward the sensing location 23. Such rearward impeller movement will be momentarily suspended before the completion thereof, when the short dwell 137' reaches the roller 135. However, the further rotation of said cam 137 will bring the hump 137" against said roller 135 and thereby effect completion of the rearward movement of said impeller plates.

At the completion of such rearward movement, the corners of the leading edge of the tablet transferred from the magazine 21 will become more or less wedged between the upper surfaces 175, 175 of the barriers 173, 173 and the under surface of the plate 87; thus preventing overrun of such tablet movement and also preventing rebound of the tablet after its edges encounter said barriers.

It will also be evident that, if there was a tablet in the inspection position 25 at the commencement of the operation just described, the impeller plate 103 would act, during the portion of the cycle thus far described, to transfer such tablet to the discharge area 27.

Near the conclusion of the aforesaid rearward movement of the impeller plates 101 and 103, the studs 141 and 143 will be brought against the lower surfaces of the springs 151 and 153, thereby to flex said springs upwardly so that, when the ears 115, 115' associated with said plates reach the rear ends of their respectively associated tracks, said springs will snap said plates downwardly, until said studs 141 and 143 engage the upper surfaces of their respectively associated tracks 161 and 161'.

At the time or just after the impeller plates 101 and 103 move downwardly, as just described, the support of the cams 433 will be withdrawn from the lever 177; whereupon the springs 189 will move the barriers 173, 173 out of the path of rearward tablet travel from the sensing location 23.

Still further rotation of the shaft 93 will withdraw the outer periphery 235ᵃ of the cam 235 from the path of the roller 233. This will permit the spring 221 to act through the bar 203 to carry the blade 201 upwardly and through the guide slot 31 of the tablet then in sensing position, thereby to accurately position the data slots in said tablet with relation to the slots 33', 35', 37' and 41' which are formed in the plate 61 for guiding the respective associated feelers 315 . . . 315. (See also Fig. 8.)

Further rotation of the shaft 93 will then cause the rise 381' of the cam 381 to act through the roller 379 and the bar 377 to raise the member 371, and to thereby carry the projection 401 against the lower ends 359 of the feeler bars 315' of the various units; thereby to move the feelers 315 upwardly through the slots provided therefor in the plate 61 and in the tablet which is then positioned for sensing.

After the rise 381' has been withdrawn from the path of the roller 379, gravity, supplemented by the spring 385, will move the member 371 to its lowered position. Continued rotation of the shaft 93 will then withdraw the surface 437' from the path of the roller 435, thus rendering the lever 423 and the bail 427 free to swing rearwardly; whereupon, the continued rotation of the shaft 93 will next cause the cams 433, 433 to act through the rollers 431 and the arms 421 to cause the bail 425 to swing the arms 415 rearwardly, so that the springs 417 will urge rearward movement of the slides 301.

Whenever, during such rearward slide movements, any associated feeler 315 encounters the barrier presented by the rear wall of the slot in which such feeler is traveling, such wall will serve as a fulcrum around which the feeler bar 315' will swing, thereby to carry its shoulder 355 rearwardly out of the path of its roller 353; whereupon said bar 315' will be shot downwardly, by its spring 361, thereby to carry such feeler out of the slot of the associated tablet.

Such rearward swing of the feeler bar 315' will act, through the stud 345, to swing the free end of the arm 333, so as to withdraw the shoulder 339 from the path of the stud 337; whereupon the bolt 317 will be shot downwardly by the spring 331.

From the foregoing it will be evident that if a tablet slotted as shown in Fig. 11 is scanned, as just described, the bolt 317 associated with the feeler 315 which is in the units of dollars slot 33 of such tablet, will be moved downwardly when the shoulder 339 is moved out of the path of the stud 337 (Fig. 9), incident to the counterclockwise swing of the bar 315' around the shaft 321 when the feeler 315 encounters the rear wall of the slot 33 in the tablet being sensed. The bolt 317 will therefore be positioned to the left of the bar 390 (as viewed in Figs. 1 and 4), and thus arrest the rearward movement of the associated slide 301 in the positioning preselected as representative of zero (0). Correspondingly, the bolt associated with the feeler in slot 35 (tens of cents) will engage the bar 393 when its associated slide has reached the positioning preselected as representing the numeral 3; and the bolt associated with the feeler which is in the slot 37 (units of cents) will engage the bar 397 when its associated slide has reached the positioning preselected as representing the numeral 7; and the bolt associated with the feeler which is in the slot 41 (departmental designation) will engage the bar 395 when its associated slide has reached the positioning preselected to represent the letter "G" (groceries).

After the rearward movements of the various slides have been arrested, as just described, their respectively associated arms 415 will continue to swing rearwardly, stretching their associated springs 417, until these arms are so positioned that, were the bolts of their associated slides engaging the bar 399, these arms would then be slightly rearward of their associated studs 419.

Because of the incidental tensioning of the springs 417, each of the slides 301 will be urged rearwardly, so as to hold its bolt 317 firmly against the one of the bars 390 . . . 399 with which the bolt had engaged for arresting the rearward movement of its slide. Such accurate positioning is important for purposes of printing (as contemplated by Fig. 14) or for governing of totalizing and/or tabulating mechanism as contemplated by Figs. 15 and 16.

The slides 301 will be retained in the position representative of the slots in the tablet being scanned, while the outer periphery 433' of the cam 433 is passing the roller 431; after which the slanting surface 433'' will be presented to the roller 431, so that the bail 425 can move forwardly in response to the springs 417 acting through the arms 415. (Figs. 1 and 4).

Such forward swing of respective ones of arms 415 will be terminated when they strike their respectively associated studs 419; whereupon, there will be no further urge imparted by the springs 417 for relative movement between the arms 415 and the slides 301 to which respective springs are connected.

Following completion of the forward movements of the various arms 415, as just described, the cam 235 will act through the roller 233 and associated parts to cause the blade 201 to swing downwardly (Fig. 3), so as to partially withdraw said blade from the recess 241; whereupon the rise 217ª of the cam 217 will act through the roller 215 and associated parts to move the blade 201 rearwardly, and thereby transfer the tablet just sensed from the sensing location 23 to the inspection location 25; whereupon, the rise 235ᵈ of the cam 235 will act through the roller 233 to withdraw the blade 201 from the tablet, and the support of the cam 217 will thereupon be withdrawn from the roller 215, thus permitting the spring 219 acting through the intervening parts, to cause the blade 201 to be moved to its forward or home position.

During the forward movement of the blade 201, just described, the cam 137 will be withdrawn from supporting the roller 135 (Fig. 2) so as to permit the spring 139 to act through associated parts to move the bar 121 forwardly, and thereby carry the impeller plates 101 and 103 to their forward or home positions.

When the slanting surface 433'' has been withdrawn from the path of the roller 431, the rise 381'' of the cam 381 will engage the roller 379 and, acting through the toggle bar 377, will raise the rack member 371; thereby to cause engaged ones of the bars 390 . . . 399 to act through the surfaces 403 of the projections 405 to raise the various bolts 317 sufficiently to carry their studs 337 above the shoulders 339 formed in the respectively associated arms 333, whereupon the springs 361, acting through their associated studs 345, will cause swinging of said arms to placements such that their associated bolts will be retained in elevated positions.

Further rotation of the shaft 93 will then carry the rise 381'' out of the path of the roller 379, permitting the member 371 to return to its lower position, responsive to gravity and the spring 385; thus carrying the bars 390 . . . 399 away from the bolts 317, so that the slides 301 may be returned to their home positions.

After the rise 381'' has been withdrawn from the path of the roller 379, the rise 437'' of the cam 437 will act through the roller 435 and associated parts to swing the bail 427 forwardly. Said bail will encounter the various arms 415, during such movement, and will thereby serve to return all of slides 301 to their forward or home positions; where said slides will be retained until the outer surface 437' is withdrawn from the path of the roller 435 in the early portion of the next cycle of action, as already more fully described.

Subsequent to the transfer of the tablet from the sensing position 23 to the inspection position 25, and prior to the conclusion of the current revolution of the shaft 93, the cams 433, 433 will act through the cam surfaces 179 of the levers 177 and associated parts (Fig. 1) to move the barriers 173, 173 to their elevated positions, in the path of tablet movement rearwardly from the sensing position 23.

If, when the face 503 of the disk 505 reaches its starting or home position, there is another tablet in the magazine 21, the finger 513 will be pressed downwardly, and will retain the lever 501 out of the path of said face. When, however, the last tablet is being withdrawn from the magazine 21, as soon as the forward edge of such tablet passes rearwardly of the end 515 of the finger 513, the spring 517 (assisted by the spring 189) will act to swing said finger upwardly, and, incidentally to carry the lever 501 into the path of the face 503, of the disk 505, and thereby prevent further rotation of the shaft 93, after completion of the revolution then in progress.

Whenever the operation of the machine is terminated, through removal of the last tablet from the magazine or otherwise, the tablet then last analyzed will remain in the inspection position for observation by the user of the machine.

It should be understood that mechanism may be constructed in accordance with this invention for processing tablets of one or another of many diverse sizes and shapes.

Obviously other structures may be devised which will embody the invention herein set forth. The drawings and the description thereof are therefore to be considered merely in an illustrative and not a limiting sense, and any words of description imported into the claims from the specification shall be considered as words of description and not as words of limitation.

It is also to be understood that the lanugage used in the following claims is intended to cover all of the generic and specific features of the invention herein described and all statements of the scope of the invention, which, as a matter of language, might be said to fall therebetween.

We claim and desire to secure by Letters Patent of the United States of America:

1. In a tablet-analyzing and computing machine, a slide bar having supporting means permitting longitudinal movement thereof from and toward a home position, means for at times resiliently urging movement of said bar away from its home position and for thereafter returning said bar to its home position, a bolt and a series of abutments engageably positioned with reference to said bolt, said bolt and abutments associated for relative displacement incident to said longitudinal movements of said bar, supporting means for said bolt and said abutments permitting relative movements thereof incident to the aforesaid longitudinal movement of said bar and further providing for relative displacements of said bolt and abutments independently of said bar movement for alternatively effecting attainment of engaging or disengaging relationships between said bar and said abutments whereby alternatively to permit movement of said bar from its home position or to serve for effecting interruptions of such movement at diverse stages thereof, means urging relative positioning between said bolt and said abutments for effecting engaging relationship, means for restraining response to said urge, mechanism for sensing indicia of tablets, and means responsive to such sensing mechanism for rendering said restraining means ineffective at diverse stages of the movement of said bar from its home position.

2. In a tablet-analyzing and computing machine, a slide bar having supporting means permitting longitudinal travel thereof from and toward a home position, means for at times resiliently urging travel of said bar away from its home position and for thereafter returning said bar to said position, a bolt with associated parts for effecting travel thereof incident to the aforesaid bar-travel either along a first path or along a second path, a series of abutments positioned along said second bolt path, said associated parts permitting movement of said bolt from one to the other of said paths independently of said bar, means urging such independent movement of said bolt from the first to the second of its said paths for thereby effecting engagement of said bolt with one or another of said abutments, means for restraining response of said bolt to said last named urge, mechanism for sensing indicia of tablets, and means associated for response to said sensing mechanism for causing said restraining means to permit movement of said bolt from the first to the second of its said paths at diverse stages of the travel of said bar from its home position.

3. In a tablet-analyzing and computing machine, a slide bar having supporting means permitting longitudinal travel thereof from and toward a home position, driving means for effecting predetermined cycles of operation, said driving means involving parts for resiliently urging travel of said bar away from its home position during a predetermined stage of the operating cycle of said driving means, for relaxing such urge during a later stage of said operating cycle, and for positively returning said bar to its home position during a still later cycle stage, a bolt with associated parts for at times effecting travel of said bolt in a first path and for at other times effecting travel of said bolt in a second path incident to the aforesaid travel of said bar, a series of abutments positioned along said second bolt path, said associated parts permitting movement of said bolt from one to the other of said paths independently of said bar, means urging such independent movement of said bolt from the first to the second of its said paths for thereby effecting engagement of said bolt with one or another of said abutments, means for restraining response of said bolt to said last named urge, mechanism for sensing indicia of tablets, and means associated for response to said sensing mechanism for causing said restraining means to permit movement of said bolt from the first to the second of its said paths at diverse stages of the travel of said bar from its home position.

4. In a tablet-analyzing and computing machine, a slide bar having supporting means permitting longitudinal travel thereof from and toward a home position, a bolt with associated parts for at times effecting travel of said bolt in a first path and for at other times effecting travel of said bolt in a second path incident to the aforesaid travel of said bar, said associated parts permitting movement of said bolt from one to the other of said paths independently of said bar, means urging such independent movement of said bolt from the first to the second of its said paths for thereby effecting engagement of said bolt with one or another of said abutments, means for restraining response of said bolt to said last named urging means, driving means for effecting predetermined cycles of operation, said driving means involving parts for resiliently urging travel of said bar away from its home position during a predetermined stage of the operating cycle of said driving means, for relaxing such urge during a later stage of said operating cycle, means for moving said bolt independently of said bar to positioning permitting re-engagement of said bolt restraining means, said last named means rendered effective during a later stage of each of such cycles, and means for positively returning said bar to its home position during a still later stage of each of such cycles.

5. In a tablet-analyzing and computing machine affording a sensing station at which tablets may be successively positioned, a slide bar having supporting means permitting longitudinal travel thereof from and toward a home position, a feeler bar having a feeler blade at an end thereof, parts associating said feeler bar with said slide bar for effecting travel of said blade from a home position in a first path and toward a home position in a second path, in the first of which paths said blade is positioned for penetrating beyond an adjacent surface of a tablet positioned at said sensing station and in the second of which paths said blade is positioned for spacing thereof from such surface, said associating parts further permitting displacement of said feeler bar with reference to said slide bar for effecting transfer of said blade from one to the other of said paths, said parts still further including means urging movement of said feeler bar for effecting transfer of said blade from said first to said second path and latching means for restraining response to said urging means during first path positioning of said blade, a bolt with associated parts for at times effecting travel of said bolt in a first path and for at other times effecting travel of said bolt in a second path incident to the aforesaid travel of said bar, a series of abutments positioned along said second bolt path, said associated parts permitting movement of said bolt from one to the other of said paths independently of said bar, means urging such independent movement of said bolt from the first to the second of its said paths for thereby effecting engagement of said bolt with one or another of said abutments, means for restraining response of said bolt to said last named urging means, parts involving said feeler bar for rendering said bolt-repsonse-restraining means ineffective at diverse stages of the travel of said slide bar from its home position, driving means for effecting predetermined cycles of operation, said driving means involving parts for acting during a predetermined stage of each of such cycles for temporarily moving said feeler bar against said last named urging means to a position where it may be retained by said latching means, for resiliently urging movement of said slide bar away from its home position during a subsequent stage of each of such cycles, for relaxing such slide bar urge during a later stage of each such cycles, and for positively returning said slide bar to its home position during a still later stage of each of such cycles.

6. In a tablet-analyzing and computing machine affording a sensing station at which tablets may be successively positioned, a slide bar having supporting means permitting longitudinal travel thereof from and toward a home position, a feeler bar having a feeler blade at an end thereof, parts associating said feeler bar with said slide bar for effecting travel of said blade from a home position in a first path and toward a home position in a second path, in the first of which paths said blade is positioned for penetrating beyond an adjacent surface of a tablet positioned at said sensing station and in the second of which paths said blade is positioned for spacing thereof from such surface, said associating parts further permitting displacement of said feeler bar with reference to said slide bar for effecting transfer of said blade from one to the other of said paths, said parts still further including means urging movement of said feeler bar for effecting transfer of said blade from said first to said second path and latching means for restraining response to said urging means during first path positioning of said blade, a bolt with associated parts for at times effecting travel of said bolt in a first path and for at other times effecting travel of said bolt in a second path incident to the aforesaid travel of said bar, a series of abutments positioned along said second bolt path, said associated parts permitting movement of said bolt from one to the other of said paths independently of said bar, means urging said independent movement of said bolt from the first to the second of its said paths for thereby effecting engagement of said bolt with one or another of said abutments, means for restraining response of said bolt to said last named urging means, parts involving said feeler bar for rendering said bolt-response-restraining means ineffective at diverse stages of the travel of said slide bar from its home position, driving means for effecting predetermined cycles of operation, said driving means involving parts associated for acting during a predetermined stage of each of such cycles for temporarily moving said feeler bar against said urging means to a position where it may be retained by its said latching means, for resiliently urging movement of said slide bar away from its home position during a subsequent stage of each of such cycles, for relaxing such slide bar urge during a later stage of each of such cycles, for moving said bolt independently of said slide bar to positioning permitting reengagement of said bolt restraining means during a still later stage of each of such cycles, and for positively returning said slide bar to its home position during a further stage of each of such cycles.

7. In a tablet-analyzing and computing machine affording a sensing station at which tablets may be successively positioned, a slide bar having supporting means permitting longitudinal travel thereof from and toward a home position, a feeler bar having a feeler blade at an end thereof, parts associated for response to such longitudinal slide bar travel for effecting movement of said feeler blade from a home position in a first path and toward a home position in a second path, in the first of which paths said blade is positioned for penetrating beyond an adjacent surface of a tablet positioned at said sensing station and in the second of which paths said blade is positioned for spacing thereof from such surface, said associating parts further permitting displacement of said feeler bar with reference to said slide bar for effecting transfer of said blade from one to the other of said paths, said parts still further including means urging movement of said feeler bar for effecting transfer of said blade from said first to said second path and latching means for restraining response to said urging means during first path positioning of said blade, a bolt with associated parts for at times effecting travel of said bolt in a first path and for at other times effecting travel of said bolt in a second path incident to the aforesaid travel of said bar, a series of abutments positioned along said second bolt path, said associated parts permitting movement of said bolt from one to the other of said paths independently of said bar, means urging said independent movement of said bolt from the first to the second of its said paths for thereby effecting engagement of said bolt with one or another of said abutments, means for restraining response of said bolt to said last named urging means, parts involving and rendered effective incident to aforesaid displacement of said feeler bar for rendering said bolt-response-restraining means ineffective at diverse stages of the travel of said slide bar from its home position, driving means for effecting predetermined cycles of operation, said driving means involving parts for acting during a predetermined stage of said operating cycles for temporarily moving said feeler bar against said last named urging means to a position where it may be retained by said latching means, for resiliently urging movement of said slide bar away from its home position during a subsequent stage of each of such cycles, for relaxing such slide bar urge during a later stage of each of such cycles, and for positively returning said slide bar to its home position during a still later stage of each of such cycles.

8. In a tablet-analyzing and computing machine affording a sensing station at which tablets may be successively positioned, a slide bar having supporting means permitting longitudinal travel thereof from and toward a home position, a feeler bar having a feeler blade at an end thereof, parts associated for response to such longitudinal slide bar travel for effecting travel of said blade from a home position in a first path and toward a home position in a second path, in the first of which paths said blade is positioned for penetrating beyond an adjacent surface of a tablet positioned at said sensing station and in the second of which paths said blade is positioned for spacing thereof from such surface, said associating parts further permitting rotational displacement of said feeler bar with reference to said slide bar for effecting transfer of said blade from one to the other of said paths, said parts still further including means urging movement of said feeler bar for effecting transfer of said blade from said first to said second path and latching means for restraining response to said urging means during first path positioning of said blade, a bolt with associated parts for at times effecting travel of said bolt in a first path and for at other times effecting travel of said bolt in a second path incident to the aforesaid travel of said bar, a series of abutments positioned along said second bolt path, said associated parts permitting movement of said bolt from one to the other of said paths independently of said bar, means urging said independent movement of said bolt from the first to the second of its said paths for thereby effecting engagement of said bolt with one or another of said abutments, means for restraining response of said bolt to said last named urging means, parts involving and rendered effective incident to said rotational displacement of said feeler bar for rendering said bolt-response-restraining means ineffective at diverse stages of the travel of said slide bar from its home position, driving means for effecting predetermined cycles of operation, said driving means involving parts for acting during a predetermined stage of each of such cycles for temporarily moving said feeler bar against said last named urging means to a position where it may be retained by said latching means and thereupon releasing said feeler bar for movement responsive to said last named urging means subject to said associated latching means, for resiliently urging movement of said slide bar away from its home position during a subsequent stage of each of such cycles, for relaxing such slide bar urge during a later stage of each of such cycles, and for positively returning said slide bar to its home position during a still later stage of each of such cycles.

9. In a tablet-analyzing and computing machine affording a sensing station at which tablets may be successively positioned, a feeler blade, means involving other portions of said machine for effecting travel of said blade from a home station in a first path in which said blade penetrates beyond an adjacent surface of a tablet positioned at said sensing station and for movement in a second path in which said blade is spaced from such an adjacent tablet surface, said other portions of said machine providing means for permitting displacement of said blade from one to the other of said paths and for urging displacement of said blade from said first to said second path, and latching means for restraining response to said urging means during penetrating positioning of said blade, a bolt with associated parts for at times effecting travel of said bolt in a first path and for at other times effecting travel of said bolt in a second path incident to the aforesaid blade travel, a series of abutments positioned along said second bolt path, said associated parts further permitting transfer of said bolt from one to the other of said paths independently of the aforesaid blade travel and providing means urging transfer of said bolt from the first to the second of its said paths for thereby effecting engagement of said bolt with one or another of said abutments, means for restraining response of said bolt to said last named urging means, and parts for rendering said bolt-response-restraining means ineffective at any one of diverse stages of the travel of said feeler blade from its home position at which stages said blade encounters a barrier to its further movement.

10. In a tablet-analyzing and computing machine, a plurality of slide bars each having supporting means permitting independent longitudinal travel thereof from and toward a home position, each of said bars further having associated therewith actuating means for at times resiliently urging travel of such bar away from its home position and for thereafter returning such bar to its home position, a bolt with associated parts for at times effecting travel of said bolt in a first path and for at other times effecting travel of said bolt in a second path incident to the aforesaid travel of said bar, said associated parts further permitting transfer of said bolt from one to the other of said paths independently of said bar travel, a series of abutments positioned along said second bolt path, means urging transfer of said bolt from the first to the second of its said paths for thereby effecting engagement of said bolt with one or another of said abutments, means for restraining response of said bolt to said urging means, mechanism for sensing indicia of tablets, and means responsive to such sensing mechanism for rendering said restraining means ineffective at diverse stages of the travel of the associated bar from its home position; driving means for effecting predetermined cycles of operation, parts responsive to said driving means for moving the actuating means for the various slide bars away from home positionings during a predetermined stage of of each of the operating cycles of said driving means, for permitting return of such actuating means toward home positionings during a later sage of each of such cycles and for positively returning said actuating means to home positionings during a still later stage of each of such cycles.

11. In a tablet-analyzing and computing machine, a plurality of slide bars each having supporting means permitting independent longitudinal travel thereof from and toward a home position, one bar for each order of tablet data to be sensed; each of said bars further having associated therewith actuating means for at times resiliently urging movement of such bar away from its home position and for thereafter returning such bar to its home position, a bolt with associated parts for at times effecting travel of said bolt in a first path and for at other times effecting travel of said bolt in a second path incident to the aforesaid travel of said bar, said associated parts further permitting transfer of said bolt from one to the other of said paths independently of said bar travel, a series of abutments positioned along said second bolt path, means urging transfer of said bolt from the first to the second of is said paths for thereby effecting engagement of said bolt with one or another of said abutments, means for restraining response of said bolt to said urging means, mechanism for sensing indicia of tablets, and means responsive to such sensing mechanism for rendering said bolt restraining means ineffective at diverse stages of the movement of the associated slide bar from its home position; driving means for effecting predetermined cycles of operation, parts responsive to said driving means for acting during a preliminary stage of each of such cycles for moving said actuating means for the various slide bars away from home positionings during a predetermined stage of each of such cycles of said driving means, for permitting return of said actuating means toward home positionings during a later stage of each of such cycles, means for moving the aforesaid bolts against their respective urging means to positionings where they may be held by the restraining means individually associated therewith during a later stage of each of such cycles, for positively returning said acuating means to positionings which will effect return of said slide bars to their home positionings during a still later stage of each of such cycles.

12. In a tablet-analyzing and computing machine, a plurality of slide bars each having supporting means permitting independent longitudinal movement thereof from and toward a home position, one bar for each order of tablet data to be sensed; each of said bars further having associated therewith actuating means for at times resiliently urging movement of such bar away from its home position and for thereafter returning such bar to its home position, a bolt with associated parts for at times effecting travel of said bolt in a first path and for at other times effecting travel of said bolt in a second path incident to the aforesaid travel of said bar, said associated parts further permitting movement of said bolt from one to the other of said paths independently of said bar movement, a series of abutments positioned along said second bolt path, means urging transfer of said bolt form the first to the secod of its said paths for thereby effecting engagement of said bolt with one or another of said abutments, and means for restraining response of said bolt to said urging means; each of said bars still further having associated therewith mechanism for sensing indicia of tablets, which mechanism includes a feeler blade, means involving other portions of said machine for effecting movements of said blade from and toward a home position in a first path in which said blade penetrates beyond an adjacent surface of a tablet positioned for sensing and for movement in a second path in which said blade is spaced from such an adjacent tablet surface and for permitting displacement of said blade from one to the other of said pahs, said other machine portions further including facilities for urging movement of said blade from said first to said second path, latching means for opposing response to said last named urging means during positioning of said blade in said first path, and means responsive to such sensing mechanism for rendering said bolt restraining means ineffective at diverse stages of the movement of the associated slide bar from its home position; driving means for effecting predetermined cycles of operation, parts responsive to said driving means for acting during a preliminary stage of each of such cycles for effecting movement of the blades associated with respective ones of said slide bars against said last named urging means to positions where they may be retained by their respectively associated latching means and thereupon effecting release of said blades for movement responsive to aforesaid urging means applied as aforesaid thereto and subject to said associated latching means, for moving said actuating means for the various slide bars away from home positionings during a subsequent stage of each of such operating cycles of said driving means, for permitting return of said actuating means toward home positionings during a later stage of each of such cycles, for moving the aforesaid bolts against their respective urging means to positionings where they may be held by the restraining means individually associated therewith during a still later stage of each of such cycles, for positively returning said actuating means to positionings which will effect return of said slide bars to their home positionings during a still further stage of each of such cycles.

13. A machine for analyzing tablets of a type having a barrier of a form suited for obstructing the travel of a feeler blade, which barrier is positioned at one or another of several preselected situations to thereby express data, which machine affords a sensing station at which such tablets may be successively positioned, a feeler bar carrying a feeler blade, means involving other portions of said machine for effecting travel of said bar from a home positioning in a path such that travel of said blade is subject to obstruction by the barrier of any such tablet during situation thereof at said sensing station, a bolt with associated parts for at times effecting travel of said bolt in a first path and for at other times effecting travel of said bolt in a second path incident to the aforesaid travel of said bar, a series of abutments positioned along said second bolt-travel-path, said associated parts permitting transfer of said bolt from one to the other of its said paths independently of said bar-travel and providing means for urging transfer of said bolt from said first to said second of its paths for thereby effecting engagement of said bolt with one or another of said abutments, means for restraining response of said bolt to said urging means, parts involving said feeler bar for rendering said bolt-restraining means ineffective at any one of diverse stages of the travel of said feeler bar from its home position at which stages said blade encounters a barrier to its further travel, and means for effecting determinations of the nature of data expressed by extents of aforesaid travel of said bar.

14. A machine for analyzing tablets of a type having a barrier of a form suited for obstructing the travel of a feeler blade, which barrier is positioned at one or another of several preselected situations to thereby express data, which machine affords a sensing station at which such tablets may be successively positioned, a feeler bar carrying a feeler blade, means involving other portions of said machine for effecting travel of said bar from a home positioning in a path such that travel of said blade is subject to obstruction by the barrier of any such tablet during situation thereof at said sensing station and for effecting travel of said bar toward its home positioning in a path such that travel of said blade is not subject to obstruction by such a barrier, said other machine portions also providing for permitting travel of said bar to transfer said blade from one to the other of said paths and means for urging such transfer from said first to said second path together with latching means for at times restraining said feeler bar against response to said urging means, a bolt with associated parts for at times effecting travel of said bolt in a first path and for at other times effecting travel of said bolt in a second path incident to the aforesaid travel of said bar, a series of abutments positioned along said second bolt-travel-path, said associated parts further permitting transfer of said bolt from one to the other of its said paths independently of said bar-travel and providing means for urging transfer of said bolt from said first to said second of its paths for thereby effecting engagement of said bolt with one or another of said abutments, means for restraining response of said bolt to said last named urging means, parts involving said feeler bar for rendering said bolt-restraining means ineffective at any one of diverse stages of the travel of said feeler bar from its home position at which stages said blade encounters a barrier to its further travel, and means for effecting determinations of the nature of data expressed by extents of the aforesaid travel of said bar.

15. A machine for analyzing tablets of a type providing a channel having an end thereof situated at one or another of several preselected situations to thereby express data, which machine affords a sensing station at which such tablets may be successively positioned, a feeler bar having a feeler blade at an end thereof, means involving other portions of said machine for effecting travel of said bar from a home positioning in a first path such that the travel of said blade is subject to obstruction by the aforesaid channel-end of any such tablet during situation thereof at said sensing station and for travel in a second path in which said blade is spaced from the adjacent surface of any tablet so positioned, said other machine portions also permitting transfer of said blade from one to the other of said paths and for urging transfer of said blade from said first to said second path, latching means for restraining said feeler bar against response to said urging means during positioning of said blade in its aforesaid first path, a bolt with associated parts for at times effecting travel of said bolt in a first path and for at other times effecting travel of said bolt in a second path incident to the aforesaid travel of said bar, a series of abutments positioned along said second bolt-travel-path, said associated parts still further permitting transfer of said bolt from one to the other of said paths independently of said bar-travel and providing means for urging transfer of said bolt from the first to the second of its said paths for thereby effecting engagement of said bolt with one or another of said abutments, means for restraining response of said bolt to said last named urging means, parts involving said feeler bar for rendering ineffective said bolt-restraining means at any one of diverse stages of the travel of said feeler bar from its home position at which stages said blade encounters a barrier to its further travel, and means for effecting determinations of the nature of data expressed by extents of aforesaid travel of said bar.

16. A machine for analyzing tablets of a type providing a plurality of channels each having an end thereof situated at one or another of several preselected situations to thereby express data, which machine affords a sensing station at which such tablets may be successively positioned, a plurality of feeler bars, each of said bars having a feeler blade at an end thereof, one feeler bar and blade for each order of data to be expressed, means involving other portions of said machine for effecting travel of said bars from a home positioning thereof in a first path such that the travel of its blade is subject to obstruction by the end of the appropriate one of the aforesaid channels of any such tablet during situation of the tablet at said sensing station and for travel of said bar in a second path in which such blade is spaced from the adjacent surface of any tablet so positioned, said other machine portions also permitting transfers of said blades from one to the other of their said paths and for individually urging transfers of said blades from their said first to their said second paths, latching means for restraining said feeler bars against response to said urging means during positionings of their said blades in the aforesaid first path, a plurality of bolts with associated parts for at times effecting travel of the various bolts in first paths and for at other times effecting travel of said bolts in second paths incident to the aforesaid travel of the associated bars, a series of abutments positioned along said second bolt-travel paths, said associated parts still further permitting transfer of said bolts, individually, from one to the other of said paths independently of said bar travel and providing means for urging transfers of said bolts from their first to their second of their said paths for thereby effecting engagements of said bolts with one or another of said abutments, means for individually restraining response of said bolts to said last named urging means, parts involving respectively associated ones of said feeler bars for rendering ineffective its said bolt-restraining means at any one of diverse stages of the travel of the one of said feeler bars associated therewith from its home position at which stages said blade encounters a barrier to its further travel, and means for effecting determinations of the nature of data expressed by extents of aforesaid travel of said bar.

17. Equipment for analyzing tablets, which tablets have openings therethrough of formation for permitting penetration of home-positioned feelers and travel of such feelers away from home positioning to certain ends thereof while continuing such penetration, said ends situated at one or another of several preselected situations to thereby express data, which equipment comprises registering mechanism providing a magazine for receiving such tablets, a sensing station, picking means for withdrawing individual tablets from said magazine and transporting them to said sensing station, a pluralily of feelers, one feeler for each order of data to be expressed, supporting parts for effecting positioning of said feelers in penetrating relationships to such tablets during situation thereof at said sensing station and for effecting travel of said feelers in paths which maintain such penetrating relationships and further providing for travel of said feelers in non-penetrating paths, means individually urging transfers of said feelers from said penetrating paths to said non-penetrating paths, means for individually latching said feelers against response to said urging means, the formation and arrangement of said supporting parts further such as will permit individual displacements of said feelers with relation to said supporting parts responsive to obstructions to feeler travel, a plurality of bolts with associated parts for at times effecting bolt travel in first paths and for at other times effecting bolt-travel in second paths incident to the aforesaid travel of respective feelers, abutments positioned along said second bolt-travel paths, means individually urging said bolts to move from the first to the second of their said paths, means for restraining response of said bolts to their said urging means, said feeler supporting and bolt associated parts involving means for rendering said response-restraining means of respective bolts ineffective at various stages of said travel, driving means for effecting predetermined cycles of operation, mechanism including said driving means and said feeler supporting and bolt associated parts for acting during a predetermined stage of each of such operating cycles for temporarily moving said feelers to latchable positionings in their aforesaid penetrating paths, for resiliently urging travel of said feelers and said bolts away from their home positionings during subsequent stages of each of such cycles, for permitting relaxation of said last named urging means during still later stages of each of such cycles, for effecting transfers of said bolts from their aforesaid second paths to their first paths during a later stage of each of such operating cycles, and for positively effecting return of said feelers and said bolts to their home positionings during a still later stage of each of such operating cycles.

18. Equipment for analyzing tablets, which tablets have a feeler receiving channel and present a barrier formed and positioned for obstructing the travel of a feeler blade at a preselected stage of such travel for thereby expressing a data characteristic, each of which tablets further has an elongated locating opening situated adjacent to and extending substantially parallel with said channel for receiving a tapered tablet-locating blade, such locating opening being of length at least a major fraction of the greatest length of any tablet channel; which equipment provides a sensing station at which such tablets may be positioned individually; a feeler for tablet data to be sensed, means for at times resiliently urging travel of said feeler toward positioning which may be occupied by barrier of tablet situated at said sensing station; a tapered tablet-locating blade formed for penetrating and thereby engaging the sides and at least one of the ends of aforesaid tablet-locating opening; driving means for effecting predetermined cycles of operation, said driving means involving a part for acting during a predetermined stage of each of such operating cycles for causing resilient urging of said tapered tablet-locating blade to effect penetration thereof through the elongated opening provided therefor in any such tablet then situated in said sensing station, said driving means also involving a part rendered effective at a later stage in each of such cycles for effecting aforesaid resilient urging of said feeler and for thereafter effecting withdraw of said locating blade from such tablet.

19. Equipment for analyzing tablets, which tablets have a feeler receiving channel and present a barrier formed and positioned for obstructing the travel of a feeler blade at a preselected stage of such travel for thereby expressing a data characteristic, each of which tablets further has an elongated locating opening situated adjacent to and extending substantially parallel with said channel for receiving a tapered tablet-locating blade, such locating opening being of length at least a substantial fraction of the greatest length of any tablet channel; which equipment provides a sensing station at which such tablets may be positioned individually; a feeler for tablet data to be sensed, means for at times resiliently urging travel of said feeler toward positioning which may be occupied by barrier of tablet situated at said sensing station; a tapered tablet-locating blade formed for penetrating and thereby engaging the sides and at least one of the ends of aforesaid tablet-locating opening; driving means for effecting predetermined cycles of operation, said driving means involving a part for acting during a predetermined stage of each of such operating cycles for causing resilient urging of said tapered tablet-locating blade to effect penetration thereof through the elongated opening provided therefor in any such tablet then situated in said sensing station, said driving means also involving a part rendered effective at a later stage in each of such cycles for effecting aforesaid resilient urging of said feeler and for thereafter effecting withdrawal of said locating blade from such tablet.

20. Equipment for analyzing tablets, which tablets have channels each presenting a barrier formed and positioned for obstructing the travel of feeler blades at one or another of several preselected stages of such travel for thereby expressing characteristics of respective orders of data, each of which tablets further has an elongated locating opening therethrough situated intermediate and extending substantially parallel with certain of said channels for receiving a tapered tablet-locating blade; which equipment provides a sensing station at which such tablets may be positioned individually; a plurality of feelers, one for each order of tablet data to be sensed, means for at times resiliently urging travel of said feelers toward positionings which may be occupied by barriers of tablets situated at said sensing station; a tapered tablet-locating blade formed for penetrating and thereby engaging the sides and at least one of the ends of aforesaid tablet-locating openings; driving means for effecting predetermined cycles of operation, said driving means involving parts for acting during a predetermined stage of each of such operating cycles for causing resilient urging of said tapered tablet-locating blade to effect penetration thereof through the elongated opening provided therefor in any such tablet then situated in said sensing station, said driving means also involving parts rendered effective at a later stage in each of such cycles for effecting aforesaid resilient urging of said feelers and for thereafter effecting withdrawal of said locating blade from such tablet.

21. Equipment for analyzing tablets, which tablets have channels each presenting a barrier formed and positioned for obstructing the travel of feeler blades at one or another of several preselected stages of such travel for thereby expressing characteristics of respective orders of data, each of which tablets further has an elongated locating opening therethrough situated intermediate and extending substantially parallel with certain of said channels for receiving a tapered tablet-locating blade, each of such locating openings being of length at least a major fraction of the greatest length of any tablet channel; which equipment provides a sensing station at which such tablets may be positioned individually; a plurality of feelers, one for each oder of tablet data to be sensed, means for at times resiliently urging travel of said feelers toward positionings which may be occupied by barriers of tablets situated at said sensing station; a tapered tablet-locating blade formed for penetrating and thereby engaging the sides and at least one of the ends of aforesaid tablet-locating openings; driving means for effecting predetermined cycles of operation, said driving means involving parts for acting during a predetermined stage of each of such operating cycles for causing resilient urging of said tapered tablet-locating blade to effect penetration thereof through the elongatd opening provided therefor in any such tablet then situated in said sensing station, said driving means also involving parts rendered effective at a later stage in each of such cycles for effecting aforesaid resilient urging of said feelers and for thereafter effecting withdrawal of said locating blade from such tablet.

22. Equipment for analyzing tablets, which tablets have data characteristic expressing channels of formations for permitting penetration of home positioned feelers and travel therein of such feelers away from home positionings thereof, each of such channels presenting a barrier formed and positioned for obstructing the travel of such feelers at one or another of several preselected stages of such travel for thereby expressing characteristics of respective orders of data, each of which tablets further has an elongated locating opening therethrough situated intermediate and extending substantially parallel with certain of said channels for receiving a tapered tablet-locating blade, each of such locating openings being of length at least a major fraction of the greatest length of any tablet channel; which equipment provides a magazine for receiving tablets to be sensed; a sensing station; picking means for withdrawing individual tablets from said magazine and transporting them to said sensing station; a plurality of slide bars, one bar for each order of tablet-data to be sensed, supporting means for said bars, which means permits independent longitudinal bar-travel from and toward home positionings thereof, each of said bars further having associated therewith actuating means for at times resiliently urging travel of such bars away from their home positionings and for thereafter returning such bars to their home positionings; feeler bars each having a feeler blade at an end thereof; parts associating said feeler bars, respectively, with said slide bars for effecting travel of such feeler blades from home positionings along a first path and toward home positionings along a second path, in the first of which blade paths such blades are positioned for penetrating into respectively associated channels beyond an adjacent surface of a tablet positioned at said sensing station and in the second of which blade paths such blades are positioned for effecting spacing thereof from such surface, said feeler bar associating parts further including means individually urging travel of such feeler bars for effecting transfers of such blades from said first to said second path and latching means for restraining response to said bar-urging means during first path positioning of such blades, said feeler bar associating parts still further including supporting means of a character for permitting rotational movements of such feeler bars with reference to their associated slide bars whenever their feeler blades encounter barriers during travel of their associated slide bars away from their home positionings, and parts for causing transfers of said blades from the first to the second of their aforesaid paths; a tapered tablet-locating blade formed for penetrating and thereby engaging the sides and at least one of the ends of aforesaid tablet-locating openings; driving means for effecting predetermined cycles of operation, said driving means involving parts for acting during a predetermined stage of each of such operating cycles for actuating said picking means to withdraw a tablet from said magazine and to transport such tablet to said sensing station, and, during an ensuing stage, for causing resilient urging of said tapered tablet-locating blade to effect penetration thereof through the elongated opening provided therefor in any such tablet then situated in said sensing station, said driving means also involving parts rendered effective at a later stage in each of such cycles for moving said feeler bars to positions where they may be retained by said latching means and thereupon releasing said feeler bars for travel responsive to aforesaid feeler bar urging means subject to said associated latching means, for thereafter moving the actuating means associated with respective feeler bars away from their home positionings and for still later permitting movement of said last named actuating means toward their home positionings, said driving means further involving parts for thereafter withdrawing said locating blade from such tablet.

23. Equipment for analyzing tables, which tablets have data characteristic expressing channels of formations for permitting penetrations of home positioned feeler blades and travel therein of such blades away from home positionings thereof, each of such channels presenting a barrier formed and positioned for obstructing the travel of such feeler blades at one or another of several preselected stages of such travel for thereby expressing characteristics of respective orders of data, each of which tablets further has an elongated locating opening therethrough situated intermediate and extending substantially parallel with certain of said channels for receiving a tapered tablet-locating blade, each of such locating openings being of length at least a major fraction of the greatest length of any table channel; which equipment provides a magazine for receiving tablets to be sensed; a sensing station; an observation station; picking means for withdrawing individual tablets from said magazine and transporting them to said sensing station; a plurality of slide bars, one bar for each order of tablet-data to be sensed, supporting means for said bars, which means permits independent longitudinal bar-travel from and toward home positionings thereof, each of said bars further having associated therewith actuating means for at time resiliently urging travel of such bars away from their home positionings and for thereafter returning such bars to their home positionings and bolts with respectively associated sets of parts for at times effecting travel of the several bolts in first paths and for at other times effecting travel of said bolts in second paths incident to the aforesaid travel of their said slide bars, either along a first path or along a second path, said associated parts further permitting transfer of such bolts from one to the other of said paths independently of the travel of such bars; a series of abutments positioned along said second bolt path; means urging transfer of such bolts from said first to said second of their paths for thereby effecting engagement of such bolts with one or another of said abutments; means for restraining response of such bolts to said urging means; feeler bars each having a feeler blade at an end thereof; parts associating said feeler bars respectively, with said slide bars for effecting travel of such feeler blades from home positionings along a first path and toward home positionings along a second path, in the first of which blade-paths such blades are positioned for penetrating into respectively associated channels beyond an adjacent surface of a tablet positioned at said sensing station and in the second of which blade-paths such blades are positioned for effecting spacing thereof from such surface, said feeler bar associating parts further including means individually urging travel of such feeler bars for effecting transfers of such blades from said first to said second path and latching means for restraining response to said bar-urging means during first path positioning of such blades, said feeler bar associating parts still further including supporting means of a character for permitting rotational travel of such feeler bars with reference to their associated slide bars whenever their feeler blades encounter barriers during travel of their associated slide bars away from their home positionings and parts for effecting disengagement of said bolt latching means incidental to such rotational travel for thereby causing transfers of each of said associated bolts and blades from the first to the second of their respective aforesaid paths; and parts for moving tablets away from said observation station concurrently with the aforesaid action of said picking means, said last named parts comprising a tapered tablet-locating blade formed for penetrating and thereby engaging the sides and at least one of the ends of aforesaid tablet-locating openings; driving means for effecting predetermined cycles of operation, said driving means involving parts for acting during a predetermined stage of each of such operating cycles for actuating said picking means to withdraw a tablet from said magazine and to transport such tablet to said sensing station, and, during an ensuing stage, for causing resilient urging of said tapered tablet-locating blade to effect penetration thereof through the elongated opening provided therefor in any such tablet then situated in said sensing station, said driving means also involving parts rendered effective at a later stage in each of such cycles for moving said feeler bars to positions where they may be retained by said latching means and thereupon releasing said feeler bars for travel responsive to aforesaid feeler bar urging means subject to said associated latching means, for thereafter moving the actuating means associated with respective feeler bars away from their home positionings and for still later permitting travel of said last named actuating means toward their home positionings and for moving the aforesaid bolts against their respective urging means to positionings where they may be held by the restraining means individually associated therewith during ensuing stages of each of such operating cycles, said driving means still further involving parts for positively returning said feeler bar actuating means to positionings which will effect return of said slide bars to their home positionings during a later stage of each of such operating cycles, for effecting partial withdrawal of said tapered tablet-locating blade from the aforesaid penetration of a sensed tablet during an ensuing stage of each of such operating cycles and thereupon moving said locating blade for effecting transfer of such a tablet from said sensing to said observation station and for thereafter withdrawing said locating blade from such tablet.

References Cited in the file of this patent

UNITED STATES PATENTS

| | | |
|---|---|---|
| 2,508,603 | Gollwitzer | May 23, 1950 |
| 2,673,034 | Smith | Mar. 23, 1954 |